(12) United States Patent
Oldford et al.

(10) Patent No.: US 6,719,122 B2
(45) Date of Patent: Apr. 13, 2004

(54) LOCKABLE LATCH FOR AN APPARATUS HAVING A COMBINED LATCH ACTUATION AND CARRIER MOVEMENT

(75) Inventors: Keith A. Oldford, Howell, MI (US); Michael R. Dugas, Brighton, MI (US); Velibor Kilibarda, Birmingham, MI (US); Alan S. Kaufman, White Lake Township, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/192,235

(22) Filed: Jul. 10, 2002

(65) Prior Publication Data

US 2003/0000802 A1 Jan. 2, 2003

Related U.S. Application Data

(63) Continuation-in-part of application No. 09/407,318, filed on Sep. 28, 1999, now Pat. No. 6,419,071.
(60) Provisional application No. 60/120,949, filed on Feb. 19, 1999, and provisional application No. 60/140,759, filed on Jun. 24, 1999.

(51) Int. Cl.[7] .............................................. B65G 47/24
(52) U.S. Cl. ............................. 198/345.3; 198/341.01; 198/345.2; 198/346.3
(58) Field of Search .......................... 198/345.3, 346.3, 198/345.2, 341.01, 345.1, 341.08; 212/346; 414/564; 118/423; 134/76

(56) References Cited

U.S. PATENT DOCUMENTS

| | | |
|---|---|---|
| 2,804,962 A | 9/1957 | Sherman |
| 3,058,604 A | 10/1962 | Harper et al. |
| 3,141,375 A | 7/1964 | Randall |
| 3,335,839 A | 8/1967 | Neumann |
| 3,415,398 A | 12/1968 | Strecke |
| 3,658,197 A | 4/1972 | DiDonato |

(List continued on next page.)

FOREIGN PATENT DOCUMENTS

| | | |
|---|---|---|
| JP | 62-166172 | 1/1986 |

(List continued on next page.)

*Primary Examiner*—Douglas Hess
(74) *Attorney, Agent, or Firm*—Young & Basile, P.C.

(57) ABSTRACT

A lowerator for an assembly system of the type including at least one rail defining a path of travel with respect to at least one workstation, and a conveyor for transporting a workpiece along the rail. The conveyor includes a trolley moveable along the rail and a carrier moveable with respect to the trolley. The carrier supports a workpiece during movement with respect to the workstation. The carrier is vertically positionable between a raised position and lowered position with respect to the trolley. The lowerator moves the carrier between the raised and lowered positions and cycles a latch for securing the carrier to the trolley when in the raised position. The lowerator includes at least one lifter or actuator defining a path of travel in at least a first direction, where the lifter actuates the latch to uncouple the trolley and carrier before moving the carrier into the lowered position at the workstation so that one or more processing operations can be performed on the workpiece. A lock, including a reciprocal pin and rotatable catch, can operably engage the latch in an engaged position for holding the carrier in the raised position with respect to the trolley. A lockout pin can be operably positioned to obstruct free movement of the latch from the engaged position until the lockout pin is removed. A guide member can be associated with each carrier for engagement with a guide channel located at the workstation for guiding movement of the carrier between the raised and lowered positions.

20 Claims, 19 Drawing Sheets

U.S. PATENT DOCUMENTS

| | | |
|---|---|---|
| 4,033,033 A | 7/1977 | Heffner |
| 4,394,897 A | 7/1983 | Brems |
| 4,646,915 A | 3/1987 | Ohtaki et al. |
| 4,667,866 A | 5/1987 | Tobita et al. |
| 4,734,979 A | 4/1988 | Sakamoto et al. |
| 4,812,211 A | 3/1989 | Sakai |
| 4,895,101 A | 1/1990 | Knorr |
| 5,027,502 A | 7/1991 | Sakamoto et al. |
| 5,177,862 A | 1/1993 | Speece |
| 5,259,494 A | 11/1993 | Hirose |
| 5,320,208 A | 6/1994 | Mason |
| 5,472,503 A | 12/1995 | Birchler |

FOREIGN PATENT DOCUMENTS

| | | |
|---|---|---|
| JP | 1-229784 | 3/1988 |

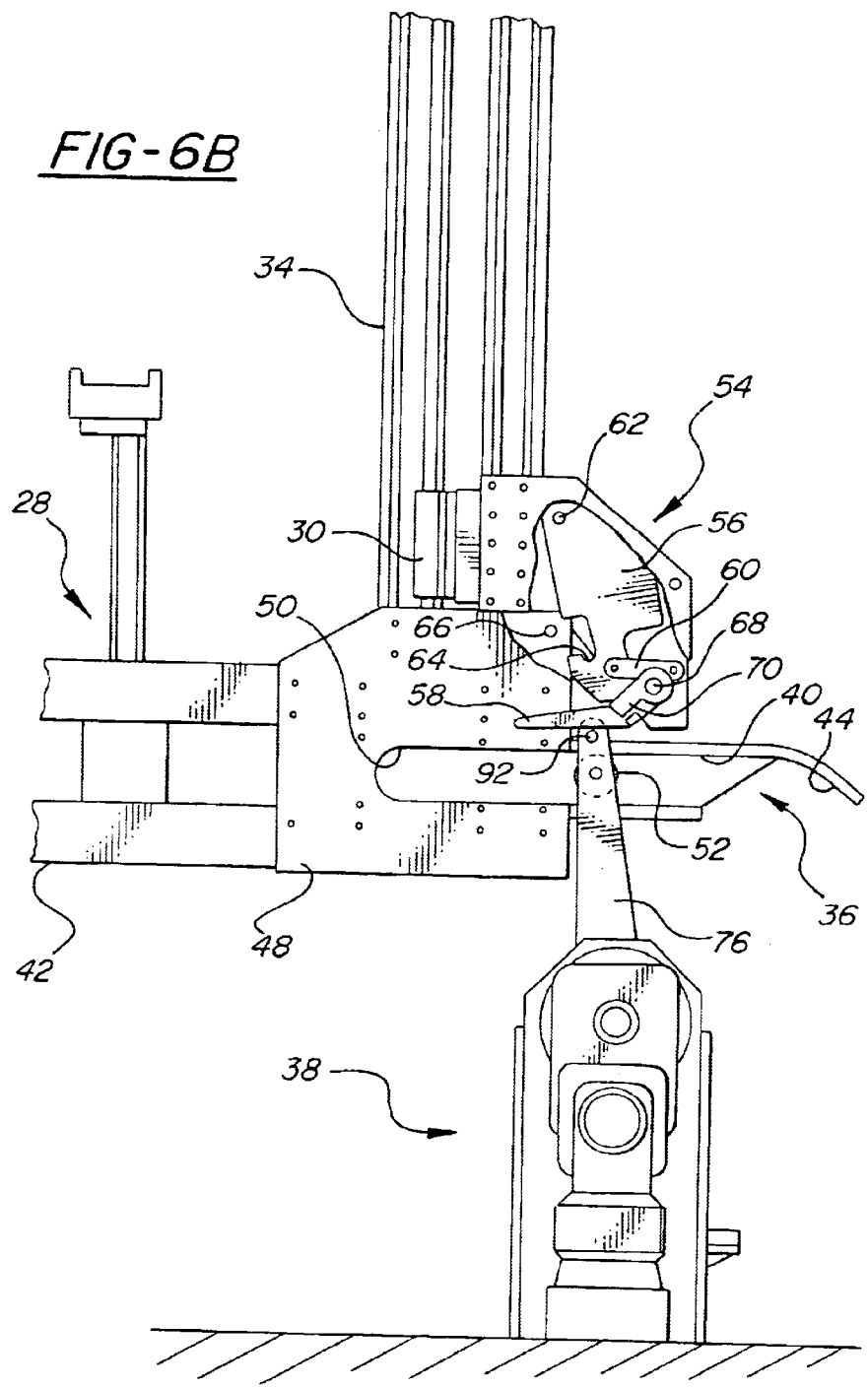

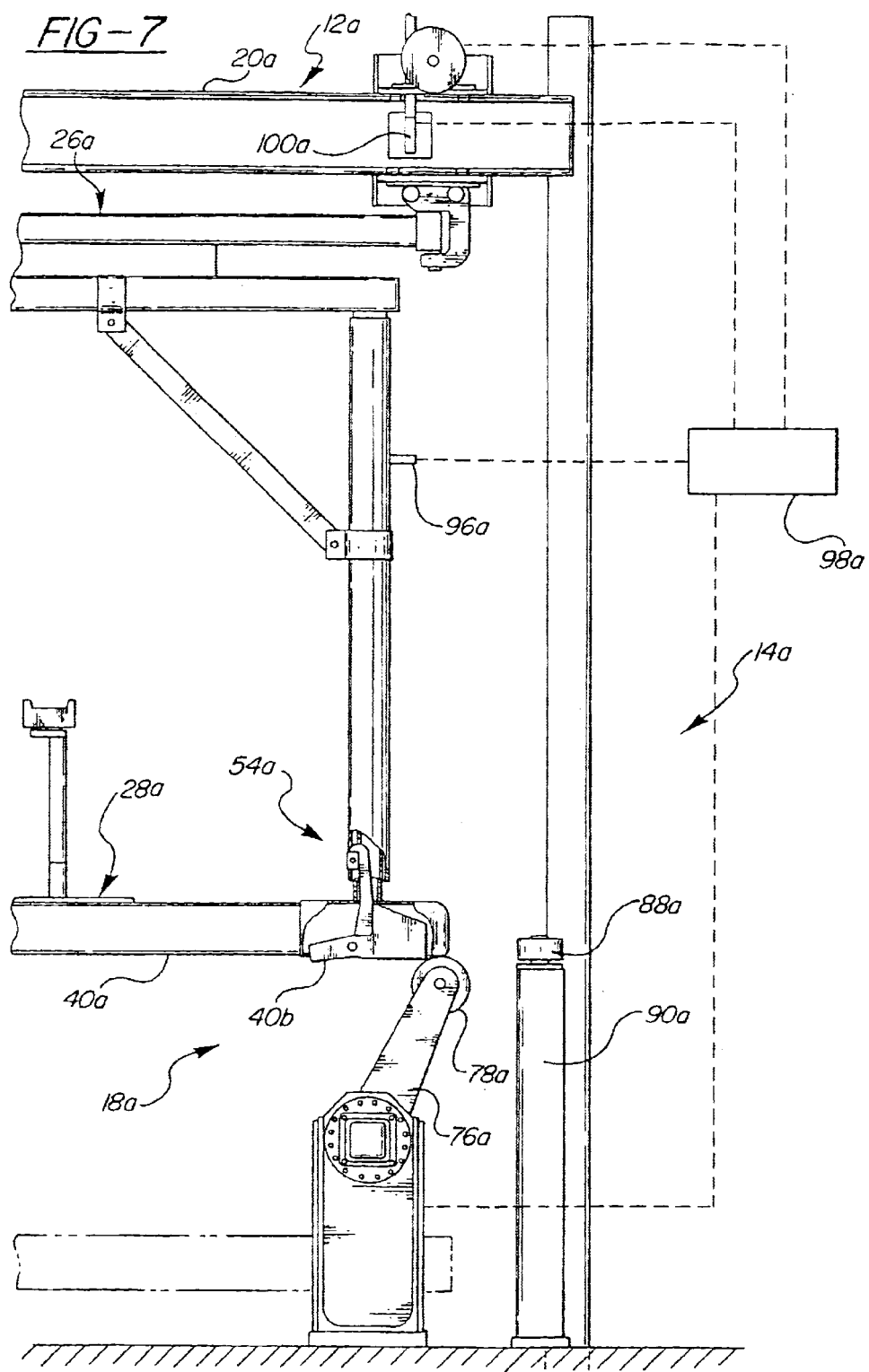

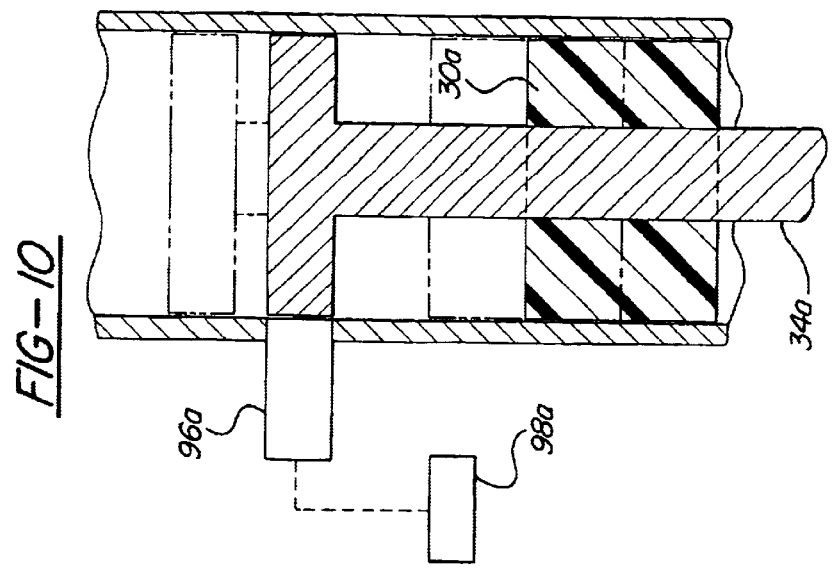
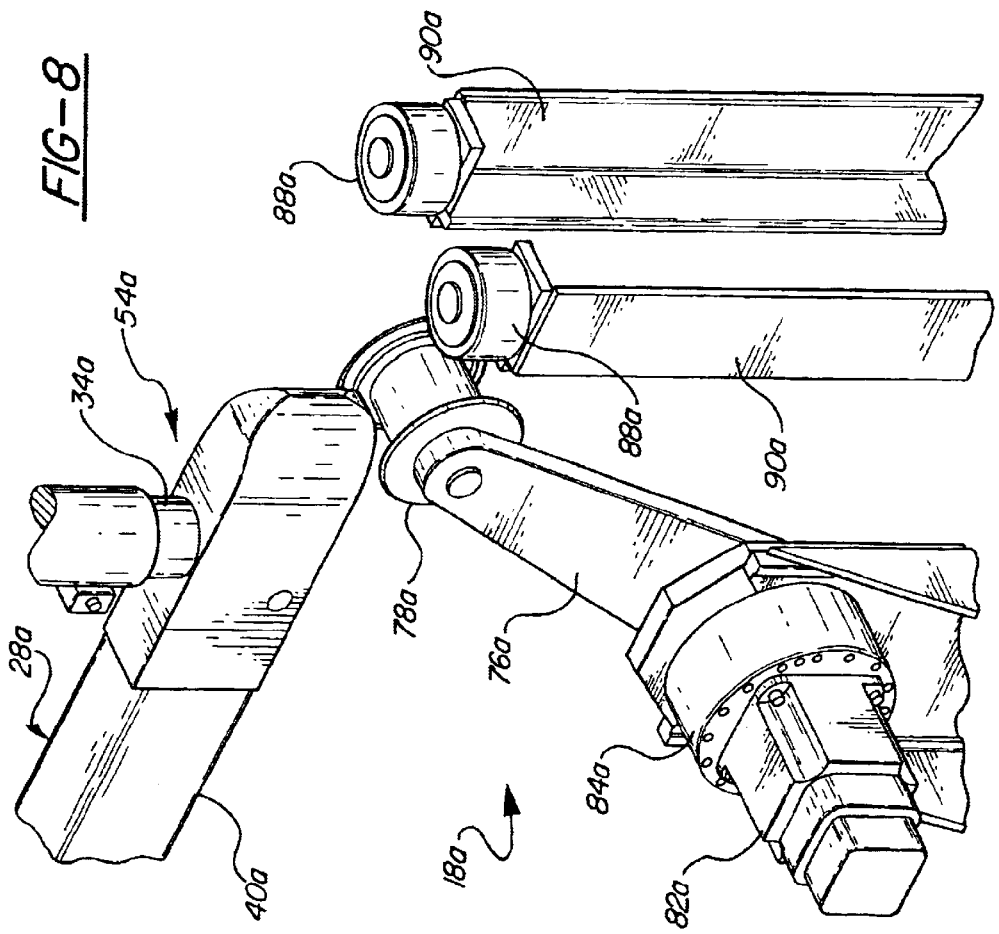

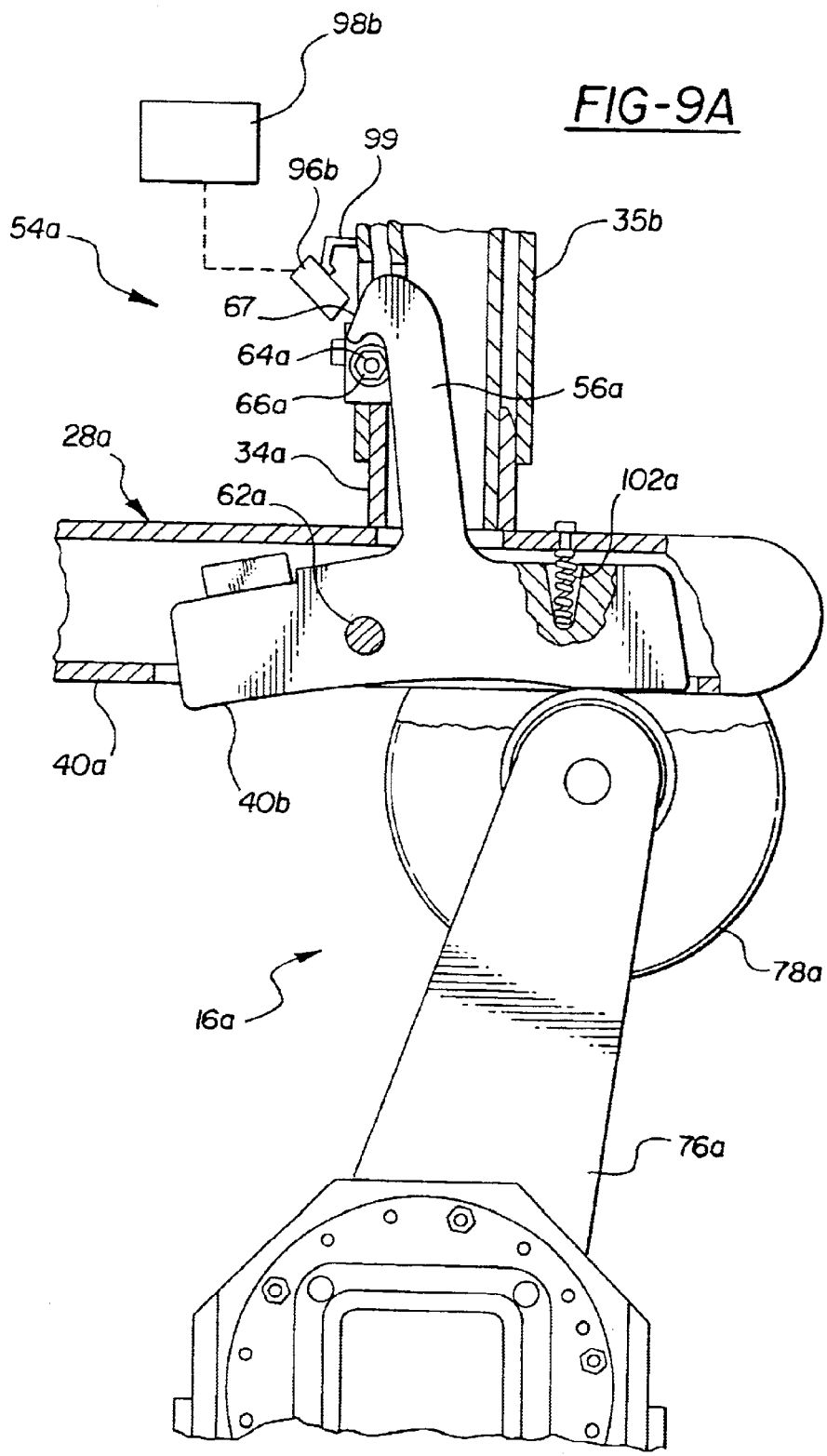

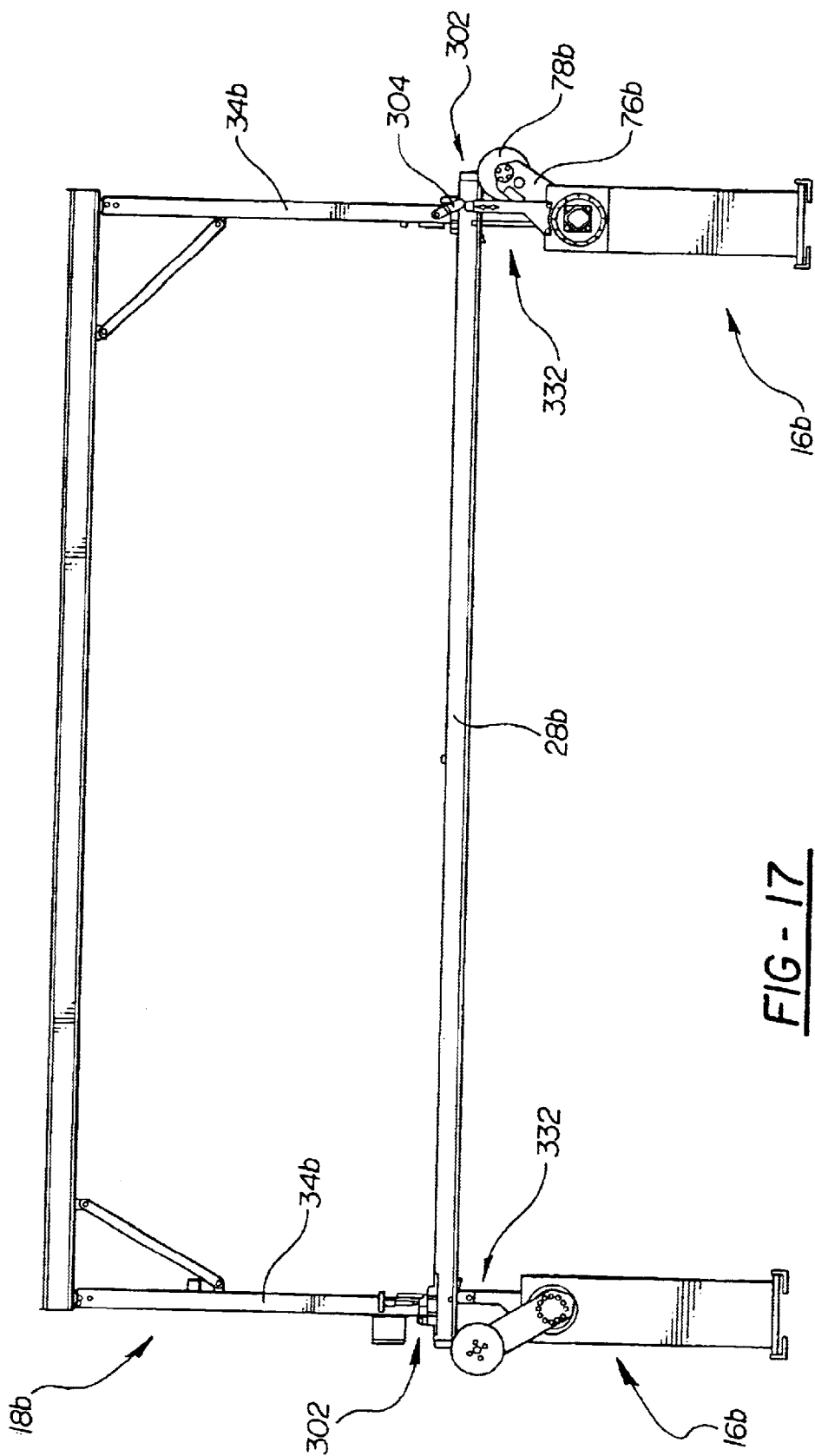

LOCKABLE LATCH FOR AN APPARATUS HAVING A COMBINED LATCH ACTUATION AND CARRIER MOVEMENT

CROSS-REFERENCE TO RELATED APPLICATIONS

This application is a continuation-in-part of patent application Ser. No. 09/407,318 for A LOWERATOR HAVING AN ACTUATOR CAPABLE OF COMBINED LATCH ACTUATION AND CARRIER MOVEMENT filed on Sep. 28, 1999, U.S. Pat. No. 6,419,071 which claimed the benefit of provisional patent application No. 60/120,949 for A LOWERATOR HAVING AN ACTUATOR CAPABLE OF COMBINED LATCH ACTUATION AND CARRIER MOVEMENT filed on Feb. 19, 1999, and provisional patent application No. 60/140,759 for a LOWERATOR MECHANISM filed on Jun. 24, 1999.

FIELD OF THE INVENTION

The present invention pertains generally to assembly systems, particularly of the type including conveyors defining a path of travel between workstations for conveying of a workpiece to one or more workstations along the path of travel, and more particularly the present invention pertains to a lowerator mechanism for raising and lowering a workpiece with respect to a workstation.

BACKGROUND OF THE INVENTION

In automotive production lines, it is generally known to transport individual workpieces, such as automotive body panels, frame components, etc., to and between workstations where selected operations, such as welding, are performed by workers, robots, or other processing equipment. Transporting individual workpieces to, and accurately placing the workpieces at, a desired workstation on a production line poses numerous difficulties. Tooling and other processing equipment at a workstation present obstacles that must be avoided by the incoming and departing workpieces. After reaching any given workstation, the workpieces must be accurately positioned within the workstation so that the necessary processing operations can be performed. The efficiency considerations of modern production lines and the like demand that workpiece delivery to a workstation be as rapid as possible.

In many common production lines and other assembly applications, workpieces are transported along an overhead rail, for instance a monorail. Motor-driven trolleys travel along the rail to and between various workstations. Electrical conductors can be provided along the rail to provide power to the trolley motors. The trolleys carry workpieces along the path defined by the rail, delivering the workpieces to the workstations.

To perform a processing operation on a workpiece transported along an overhead rail, some mechanism must be provided to raise and lower the workpiece with respect to the workstation. Prior known mechanisms for raising and lowering a workpiece into the workstation have moved the entire workpiece-laden trolley along with an entire section of the overhead rail. This type of mechanism is complicated in design and prone to mechanical failures. For example, joints must be provided between the fixed and moveable rail sections for the electrical conductors responsible for powering the trolleys. It can be difficult to ensure that the section of rail lowered with the trolley is properly realigned with the fixed rail sections. If the conductors of the lowerable and fixed rail sections become misaligned, unreliable or faulty system operation can result. This negatively impacts the operational capacity of the production or assembly lines, for instance by causing wasteful "down-time" for repairs. In addition to the foregoing disadvantages, the prior known mechanisms cycle at relatively slow speeds, since the weight of the carrier, trolley, and rail must all be borne by the movement mechanism.

One proposed solution to the foregoing teaches an automatic monorail system including a lowerator mechanism mounted to the monorail above the workstation. A trolley is provided including a workpiece carrier supported thereon by a pair of latches pivotally connected to and carried by the trolley. The lowerator mechanism is operable to lift the workpiece carrier from the trolley latches, and the lowerator lowers the workpiece carrier to the workstation without lowering the trolley or monorail. The lowerator mechanism is mechanically complex. One of the lowerator mechanisms is provided at each workstation. Each lowerator mechanism includes a pair of support rollers mounted in vertically moveable slides, first power actuators for vertically driving the slides, and second power actuators for pivoting the latches. The first power actuators are used first for raising the slide to cause the support rollers to contact the carrier upper support beam and to lift the carrier a short distance off from the trolley latches. The second power actuators can then pivot the trolley latches from under the carrier upper support beam, and the first actuators operate to lower the carrier without any movement of the monorail or the trolley. This complicated lowerator mechanism is mounted to the monorail framework above each workstation requiring increased load carrying capacity for the monorail framework.

Consequently, the need exists for improvements in lowerator devices. Particularly, there exists the need for a lowerator mechanism which meets the efficiency requirements of modern production and assembly lines, and which is simple in operation.

SUMMARY OF THE INVENTION

An apparatus according to the present invention includes at least one workpiece carrying trolley that travels along a path between workstations. The workstations can be configured along almost any path that suits the operations to be performed on the carried workpieces. A rail system, having one or more rails, is located with respect to the workstations. For example, a monorail can be suspended from a framework located above the workstations. The monorail can define the path of travel above and through the workstations. The trolleys travel along the monorail between the workstations. The trolleys can be powered by any suitable electrical or mechanical means, such as by power picked up by sliders in contact with electrical conductors mounted to the monorail, or belt driven, or chain driven, or rack and pinion gear driven, or the like.

Each trolley supports a workpiece carrier. The trolley can include at least two vertically extending posts spaced in the direction of the path of travel from one another. The carrier can include a workpiece nest or other workpiece support structure connected to and supported by the posts. The nest or support structure can be designed to support one or more workpieces and can be configured in the manner best suited to the shape of the workpiece and the operations to be performed at the workstation, such as welding multiple workpieces to one another into an assembled product, or subassembly, or other workpiece processing, such as shaping, painting, fastening, gluing, or the like. The trolleys can be driven independently of one another and are controllable to stop at predefined positions, such as at each workstation along the path of travel.

As a trolley approaches a workstation, the carrier engages guide slots or rollers to position the carrier with respect to an actuator. The actuator is mounted to the floor or base of the workstation for moving the carrier with respect to the stationary trolley at the workstation. The actuator according to the present invention is separate from the rail system supporting the trolley. The carrier is lowered by the actuator through a predetermined distance at the workstation, including an additional distance below the workstation nest or tooling, after the weight of the workpiece has been transferred to the nest or tooling, in order to ensure transfer of the workpiece from the carrier to the workstation tooling. The workpiece is positioned in a final location at the workstation by known guides, blocks, and clamps that form part of the workstation tooling. The carrier is guided loosely through predetermined gaps and clearances between vertical surfaces in slide blocks within the posts which permit the carrier to float while descending to enable each workpiece to reach the desired final location.

The present invention provides a lowerator mechanism of simple design and efficient operation. The lowerator mechanism of the present invention can be used in an assembly system of the type including one or more rails defining a path of travel between one or more workstations, and one or more conveyors, for example a trolley-driven carrier, for transporting at least one workpiece along the path of travel. According to the present invention, the conveyor includes a trolley and carrier, the carrier supports the workpiece while moving along the path of travel. The carrier is vertically positionable between raised and lowered positions with respect to the trolley to selectively bring a workpiece into position at a workstation. A latch is provided for securing the carrier to the trolley in the raised position. An actuator or lift is provided at the workstation for positioning the carrier between the raised and lowered positions. Preferably, the lift is support separate from the overhead rail, and most preferably is support from the floor or base of the workstation. The positioning lift defines a path of travel in first and second directions, wherein in the first direction of travel the positioning lift actuates the latch to uncouple the trolley and the carrier and move the carrier into the vertically lowered position, and wherein in the second direction of travel the positioning lift moves the carrier member into the vertically raised position and actuates the latch so as to secure the carrier to the trolley in the raised position.

The present invention provides a lock for preventing unintentional movement of the carrier with respect to the trolley. The carrier can include a pin movable between a locked position and an unlocked position with respect to the latch when the latch is in an engaged position for holding the carrier in a raised position with respect to the trolley. A rotatable catch is mounted with respect to the trolley. When the catch traps the pin in the locked position, the latch is prevented from moving from the engaged position to a disengaged position. An actuator located at each workstation operably moves the catch from the trapped position to a released position allowing the pin to move from the locked position to an unlocked position in response to movement of the latch from the engaged position to the disengaged position. The actuator acts on the catch as the carrier moves toward a stopped position at each workstation. The actuator can be a stationary member or finger engagable with the catch, as the trolley supporting the carrier is approaching the stopped position, to rotate the catch about an axis of rotation from the trapped position to the released position when the trolley and supported carrier are stopped at the workstation. When the trolley and supported carrier move away from the stopped position at each workstation, the catch returns from the released position to the trapped position to move the pin from the unlocked position to the locked position with respect to the latch. The lock defined by the combination of the pin and catch prevents unintentional unlatching of the carrier from the trolley until the combination of actions occur where the catch is moved to the released position and the latch is moved to the disengaged position. The lock according to the present invention can include a lockout pin for preventing unintentional movement of the carrier with respect to the trolley until the lockout pin has been removed. The lockout pin is engagable through a aligned coaxial apertures associated with one of the trolley and the carrier for supporting the lockout pin in a position obstructing free movement of the latch from the engaged position. A movable member can be positioned between the lockout pin and the latch for obstructing movement of the that latch when the lockout pin is located within the coaxial apertures.

According to the present invention, at least one guide member, such as a roller, can be associated with the carrier and engagable with respect to a guide channel positioned at a workstation. The guide channel is located at a workstation for receiving the guide member when the carrier is being moved vertically for guiding movement of the carrier between the raised and lowered positions at the workstation. The guide channel can include an enlarged opening adjacent the top portion for directing the guide member toward the lower portion of the guide channel.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 6A–6C provide detailed elevational views of the lowerator mechanism in operation;

FIG. 7 is a side elevational view of the preferred embodiment of a lowerator according to the present invention;

FIG. 8 is a detailed perspective view of the preferred embodiment of the lowerator according to the present invention;

FIGS. 9A–9C are detailed cross-sectional illustrations of the latch mechanism and actuator of the preferred embodiment of the lowerator according to the present invention;

FIG. 10 is a simplified schematic diagram of a post-position sensor according to the present invention;

FIG. 17 is a side view of a lowerator having the lock at both ends of a carrier according to the present invention.

DETAILED DESCRIPTION OF THE PREFERRED AND ALTERNATIVE EMBODIMENTS

Figure 1:
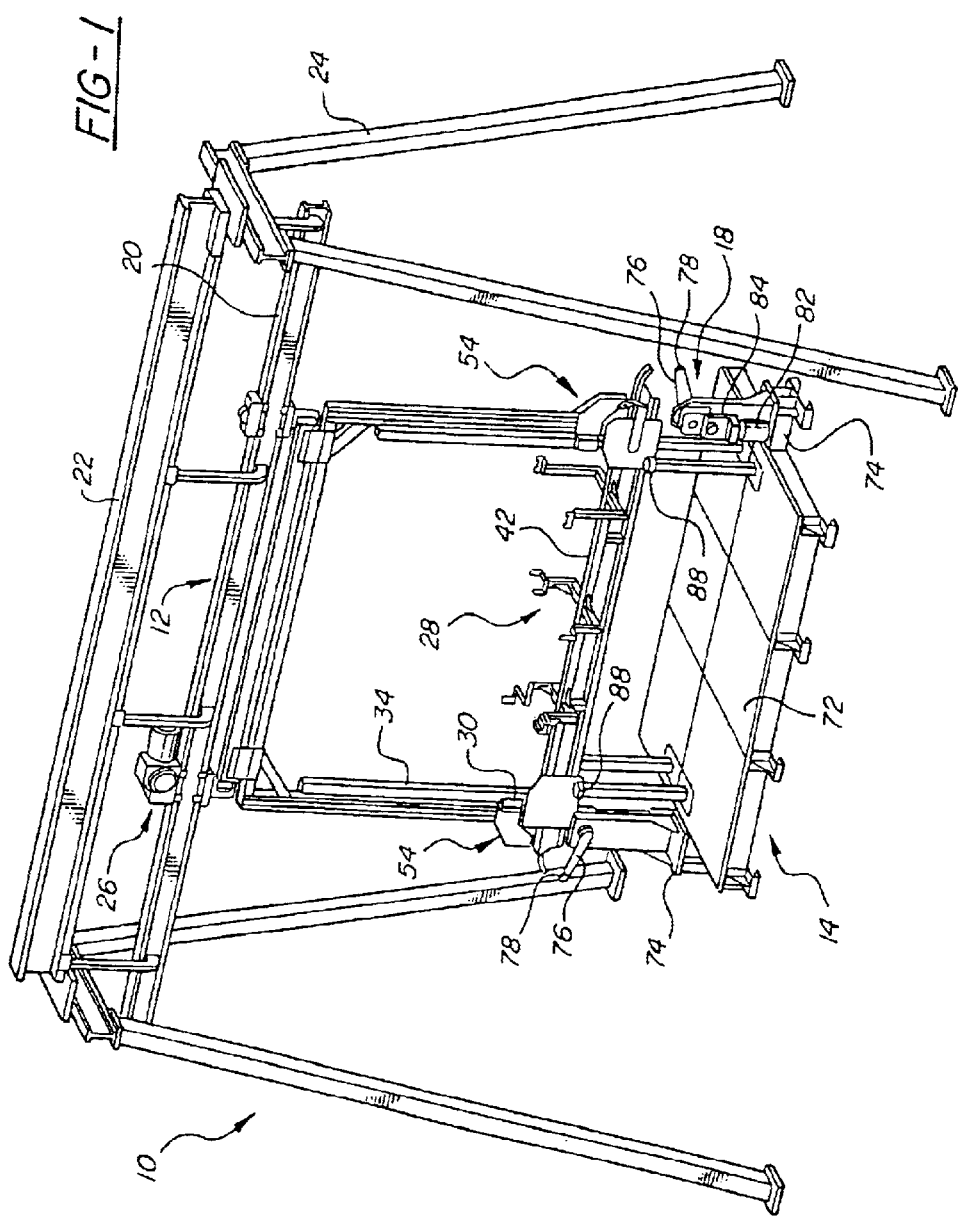
FIG. 1 is a perspective view of the present invention, shown in an exemplary operational environment.

Referring now to FIG. 1, the present invention generally includes workpiece conveyance means 10 for transporting a workpiece along path means 12 for defining a path of travel between workstations 14 positioned along the path means, and locator means positioned at the workstation and operative for locating the workpiece at the workstation. A lowerator 18 is provided for moving the workpiece between the conveyance means 10 and the locator means. For purposes of illustration, the lowerator 18 is shown in combination with an assembly system including the path means 12 and workstations 14. The conveyance means 10 transports workpieces between the workstations 14, where one or more specific processing operations are performed on the workpieces. For instance, the assembly system can be in the form of an automotive production line where workpieces, such as automotive body panels and frame components, are progressively assembled at the workstations 14 along the path 12 of travel. While a particular operational environment is illustrated herein, it is not intended to be limiting with respect to the present invention, which will have numerous applications as understood by those of skill in the art.

More particularly, the path means 12 can include at least one rail 20, such as an overhead monorail, suspended from a support structure such as a coextensive horizontal spine 22 and intermittently spaced vertical supports 24. The workpiece conveyance means 10 includes driving means in the form of a motor-driven trolley 26 operative to move the conveyance means 10 along the rail 20 in known fashion. As with other aspects of the depicted operational environment, the illustrated driving means are not intended to be limiting with respect to the present invention, and any desired driving means can be adopted to serve the purpose of moving the conveyance means 10 along the selected path means 12 in the desired operational environment.

Figure 2:
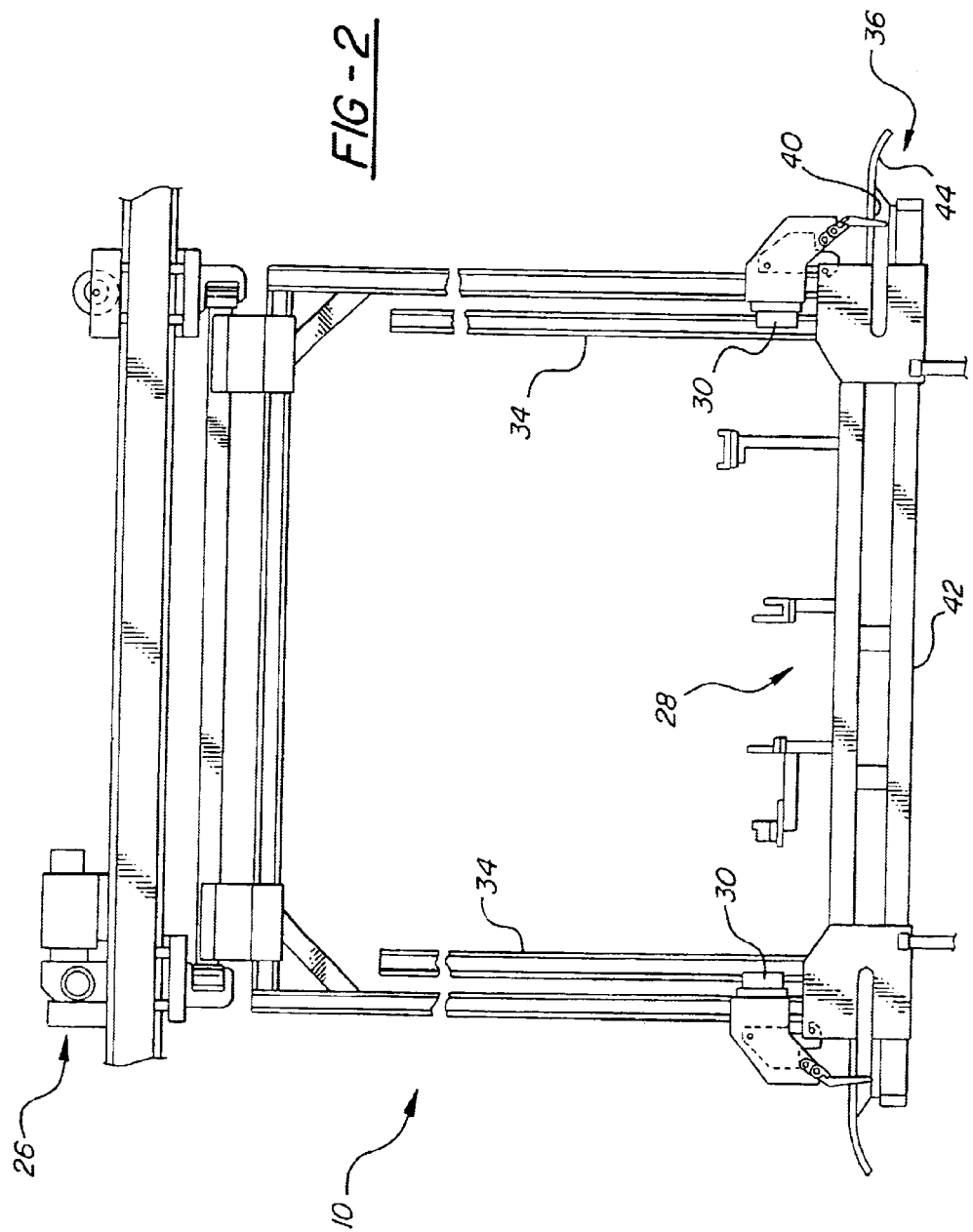
FIG. 2 is a lateral elevational view of the present invention, shown in an exemplary operational environment.
Figure 3:
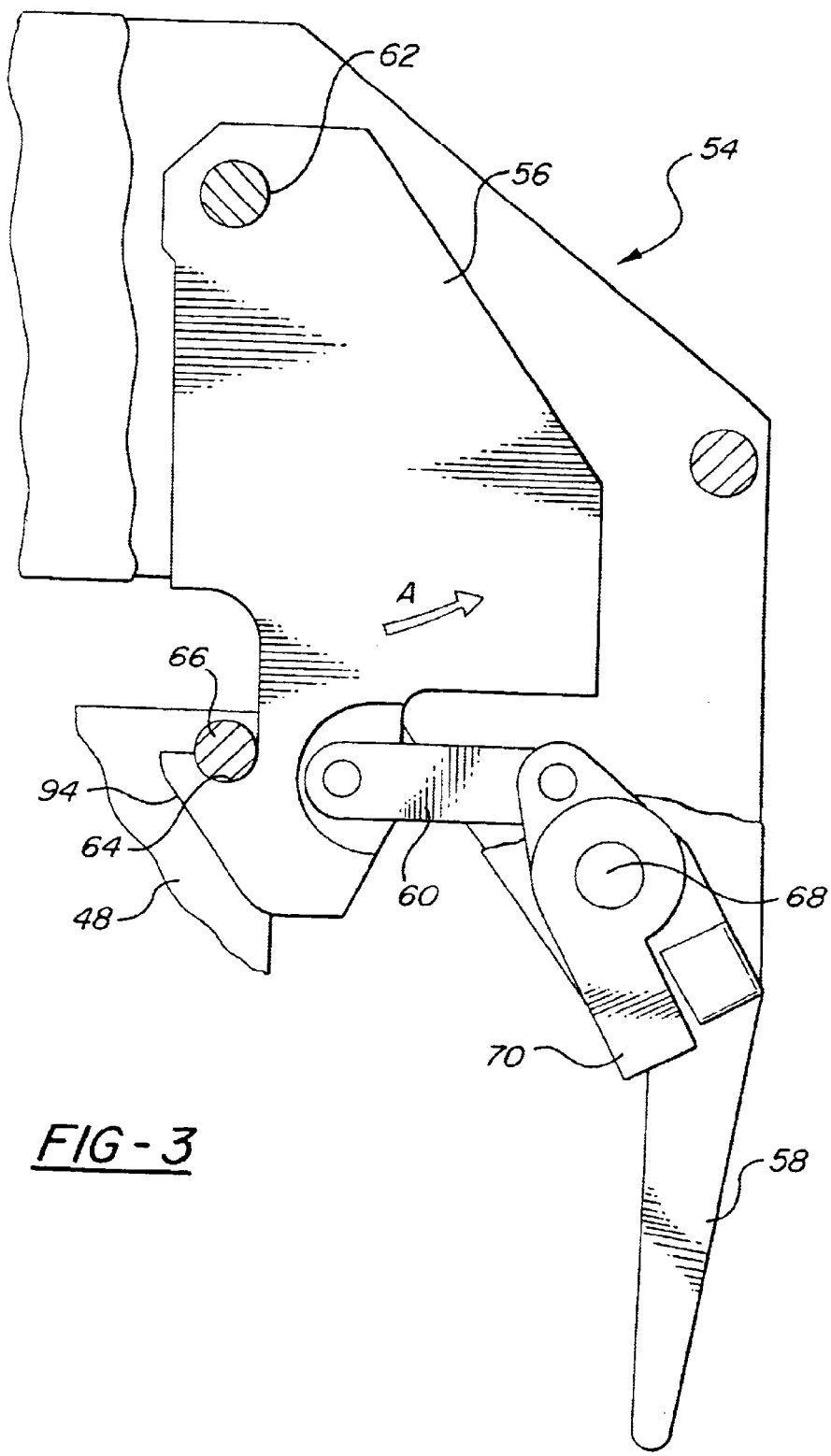
FIG. 3 is an end-wise elevational view depicting the lowerator mechanism of the present invention.

Referring now to FIGS. 2 and 3, the workpiece conveyance means 10 generally includes both the trolley 26 and a carrier 28. The trolley 26 is configured generally in an inverted "U" shape, with horizontal and vertical members. The horizontal member is fixed to a parallel-disposed support cross-piece providing a point of attachment for trolley 26 or other driving means as appropriate. The trolley 26 is thus immovably associated with the driving means and moves along the path means 12 in conjunction therewith. The carrier 28 is also generally in a "U" shape, including a horizontal member and a vertical member. Workpiece carrying means, such as carrier 28, in the form of a workpiece nest can include a plurality of projecting fingers or antlers disposed on a horizontal element of the carrier 28 to support the workpiece being conveyed. The configuration of the workpiece nest can take any form desired and appropriate for the workpiece to be conveyed and the work to be performed thereon. Each of the trolley 26 and carrier 28 may include lengths of metal plates, beams, brackets, or tubing joined by welding, joining plates, or other known means, though other suitably strong materials may be substituted.

Figure 4:
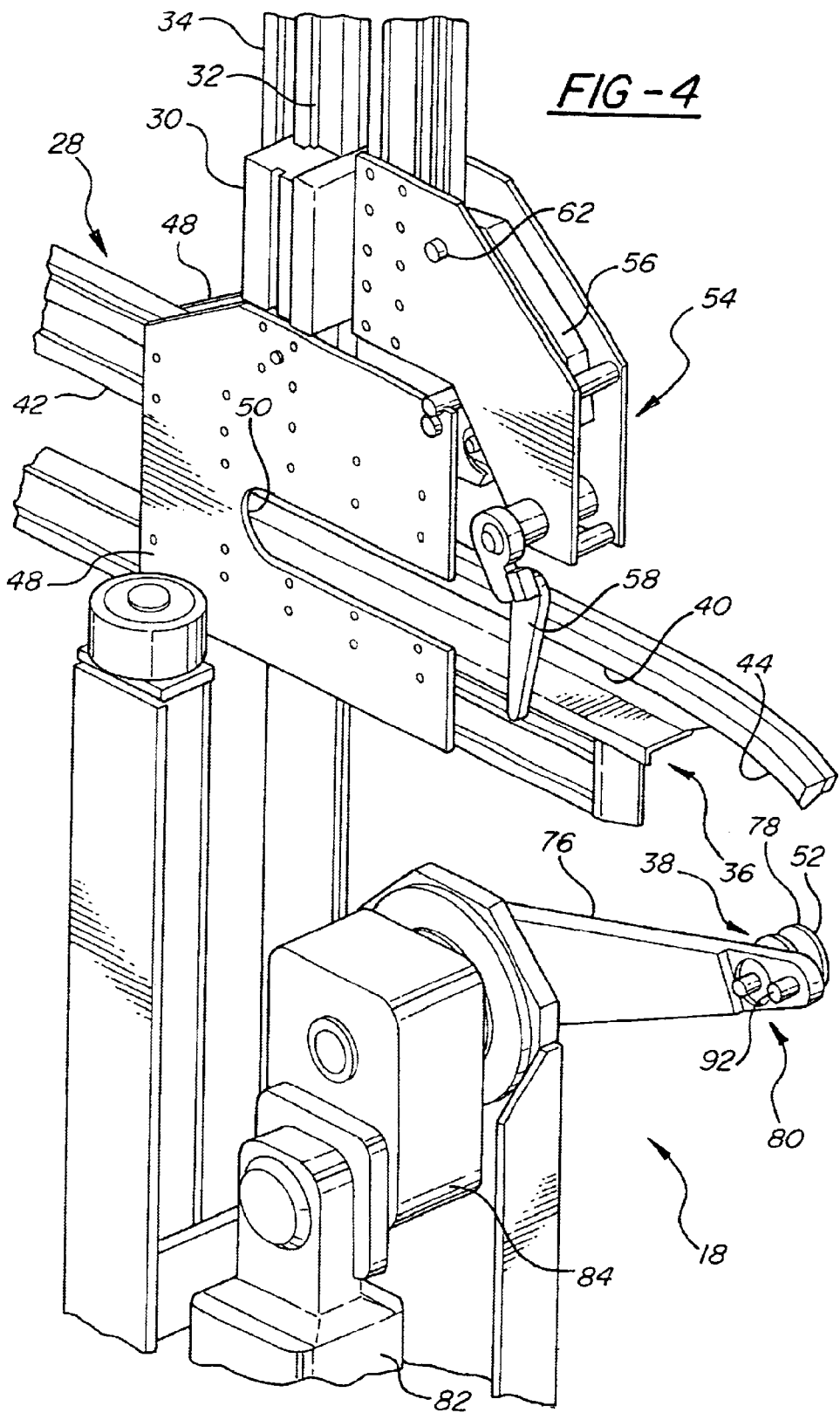
FIG. 4 is a detailed cut-away view of the latch means of the present invention.

As indicated, the carrier 28 is slidingly associated with trolley 26 so as to be moveable vertically in relation to the trolley 26 in order to lower a workpiece into the workstation 14 without the necessity of lowering the entire conveyance means 10 and a section of the rail means 20, as with some prior known mechanisms. Bearing blocks 30 are provided, one associated with each of the vertical members, the bearing blocks being dimensioned to slidingly receive the vertical elements 34 of the carrier 28 therein. Referring now to FIG. 4, bearing surfaces 32 are provided along the length of vertical elements 34 to define a travel surface for sliding movement of the carrier 28.

Means 36 are provided associated with the carrier 28 for receiving the positioning means 38. Referring now to FIGS. 2 and 4, receiving means 36 can include a cam surface 40, such as a channel or slot, preferably provided at both ends of the horizontal member 42 of the carrier 28. Cam surface 40 is fashioned from metal or other suitably strong material. The cam surface 40 illustrated in FIGS. 1–2 and 4–6C includes an outer travel surface extending beyond the channel opening to define a radiused portion 44. The cam surface 40 is fixed between plates 48 connected to the horizontal member 42 of the carrier 28. The plates 48 include cut-out portions 50, leaving a sufficient length of each cam surface 40 unobstructed for movement of the positioning means 38 therealong. The cam surface 40 opens outwardly away from each end of the carrier 28. The cam surface 40 is dimensioned to receive therein a lifter roller 52 of the positioning means 38.

For travel between workstations, the carrier 28 is supported in a vertically raised condition on the trolley 26 by latch means 54. Referring now to FIGS. 2–4, and more particularly to FIG. 3, the latch means 54 can include a latch arm 56 operatively connected to a lever arm 58 by a transfer link 60. The latch arm 56 pivots about a fixed point defined by a pivot pin 62 extending between parallel plates 48 connected to the trolley 26 as shown in FIG. 4. A pin-receiving portion 64 of the latch arm 56 receives therein a pin 66 fixed to the parallel plates 48 provided on the carrier 28. The lever arm 58 is pivotally mounted outside of one of the plates 48 about a fixed pivot point 68. The lever arm 56 is preferably biased, such as by a spring means 70, or the like, towards the position shown in FIG. 3.

Figure 5:
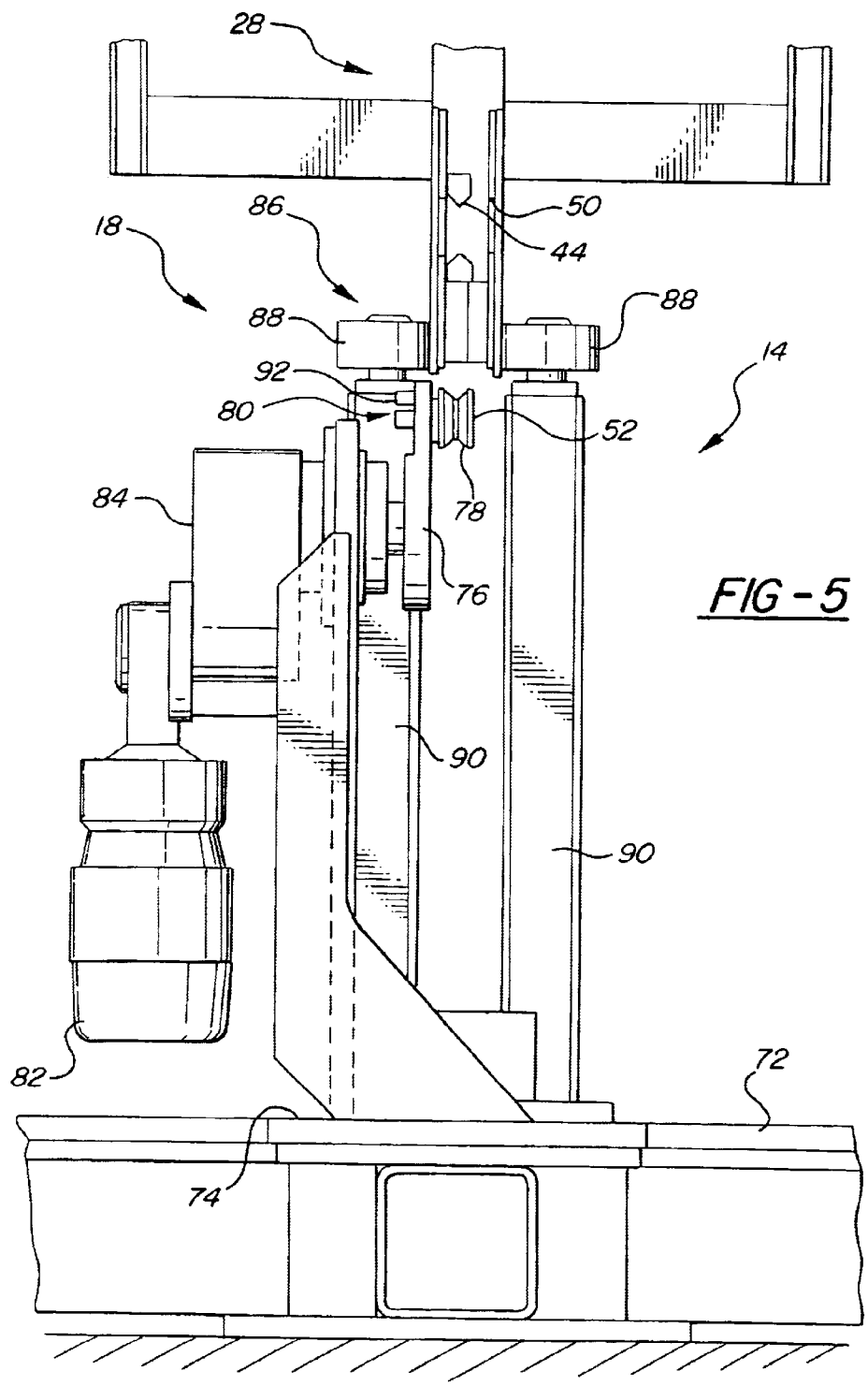
FIG. 5 is a detailed perspective view of the latch means and lowerator mechanism of the present invention.

In the embodiment shown in FIGS. 4–5, the lowerator 18 is shown provided at a workstation 14. The workstation 14 is shown with a base 72, and according to this embodiment, the lowerator 18 is fixedly mounted to the base 72 by appropriate support structure 74. The lowerator 18 can include a lifter arm 76 adapted for rotational movement. A roller 78 is rotatably mounted adjacent the terminal free end of the lifter arm 76. The roller 78 is receivable with respect to the cam surface 40, such as the illustrated channel. Means 80 for actuating the latch means 54 is provided adjacent the terminal end of the lifter arm 76, and extends radially outward from lifter roller 78. The latch actuating means 80 can include an actuator pin 92 projecting to engage the lever arm 58. The lowerator 18 is preferably motor-driven, and a motor 82 and gearbox 84 are provided in operative association with the lifter arm 76. The motor 82 can be powered by any desired conventional means. The radial dimensions of lifter arm 76 are such that, during rotational movement thereof, roller 78 is received with respect to the cam surface 40, such as the channel of the carrier 28, when the conveyance means 10 is positioned at the workstation 14.

Referring now to FIGS. 2 and 5, the lowerator 18 is provided in alignment at opposite ends of the conveyance means 10. The lowerator 18 is positioned at an appropriate workstation 14 in relation to the path of travel of the conveyance means 10 such that, after arrival of the conveyance means 10 at the workstation 14, rotational movement of the lifter arm 76 brings the roller 78 into contact with the cam surface 40, such as the channel of the carrier 28. As best seen in FIG. 5, guide means 86 is disposed at the workstation 14 to facilitate proper alignment of the lowerator 18 with the conveyance means 10, and prohibit unwanted lateral movement of the conveyance means 10 during operation of the lowerator 18. These guide means 86 can include horizontally oriented guide rollers 88 arranged on support posts 90 in opposing fashion on either side of horizontal member of the carrier 28 to define a path therebetween for receiving the conveyance means 10. Two such pairs of guide means 86 are preferably provided, one pair at predetermined locations of each end of the horizontal member when the conveyance means 10 come to a stop at the workstation 14.

Figure 6A:
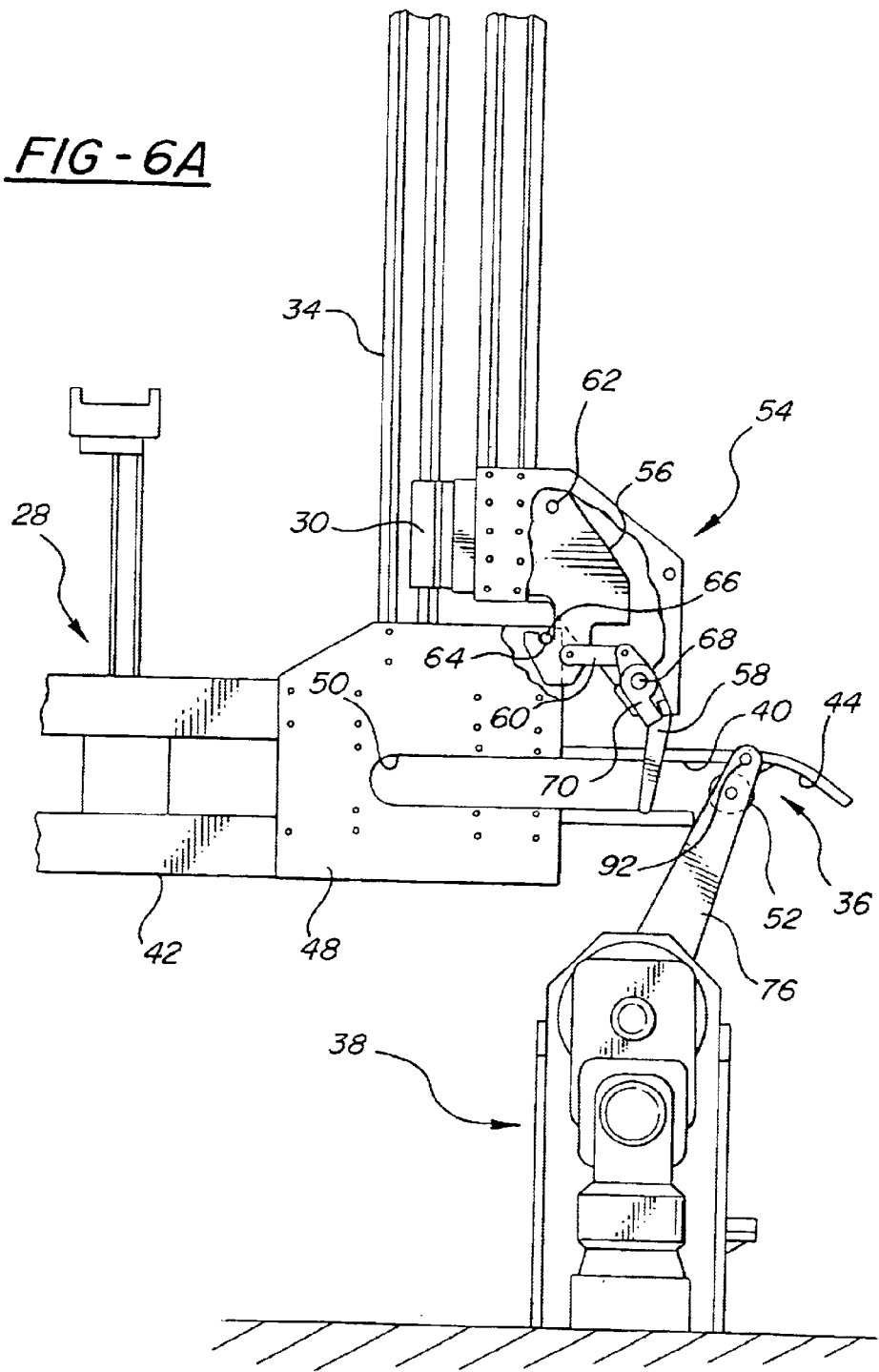
Figure 6C:
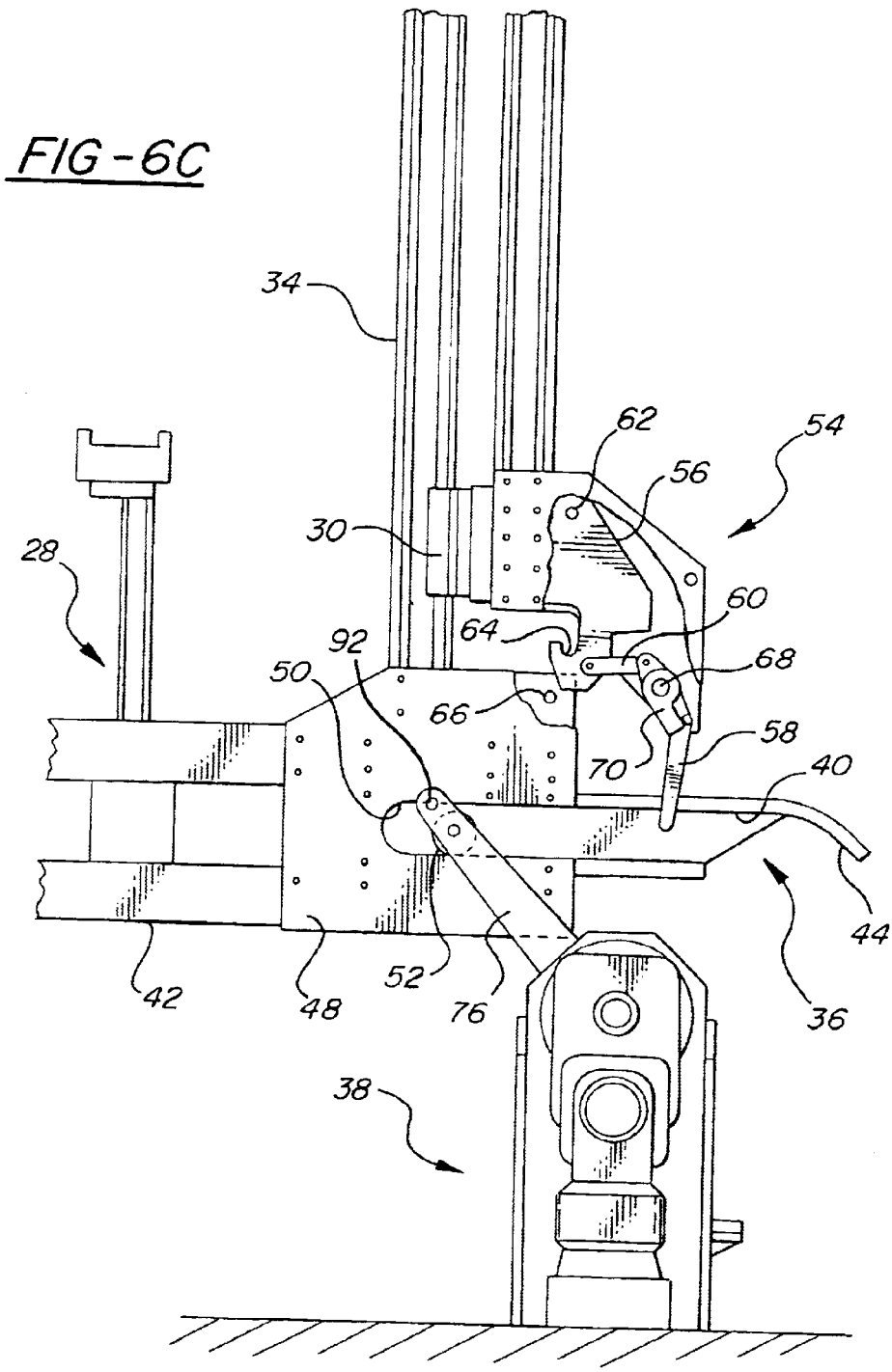

Referring now to FIGS. 6A–6C, after arrival of the conveyance means 10 at the appropriate workstation 14, rotational movement of the lifter arm 76 commences. In the lowering cycle of operation, the lifter arm 76 rotates forwardly from a start position, shown in FIG. 4, bringing the roller 78 into engagement with the cam surface 40, such as the illustrated channel of the carrier 28, best seen in FIG. 6A. With continuing rotational movement of the lifter arm 76, the roller 78 circumscribes an arcuate path while moving upwardly within the illustrated channel, where the roller 78 engages cam surface 40 to urge the carrier 28 vertically upwards until reaching the maximum vertical height of the arc as best seen in FIG. 6B. This action drives the latch pin 66 upwards and out of engagement with the latch arm 56. Simultaneous with the upwards movement of the carrier 28, actuator pin 92 actuates the lever arm 58, urging the lever arm 58 to pivot about an axis in a first, clockwise direction. The rotation of the lever arm 58 urges the transfer link 60 in an outward direction "A" away from the pin 66 to draw the latch arm 56 out of the vertically downward path of travel of the pin 66. Continued forward rotational movement of the lifter arm 76 effects vertically downward movement of the carrier 28 relative to the trolley 26, until the carrier 28 is brought into position at the workstation 14 as best seen in FIG. 6C. Locator pins (not shown) may be provided at the workstation as necessary to receive the workpiece and/or carrier 28. It will be appreciated that the length of the cam surface 40, such as the channel of the carrier 28, is sufficient to provide for unimpeded movement of the roller 78 throughout the range of motion of the lifter arm 76, both in the counter clockwise direction, and for raising the carrier 28 to the latched position, the clockwise direction.

From the foregoing it will be appreciated that the operation of raising the carrier 28 into latched engagement with the trolley 26 takes place according to the foregoing description, except in reverse order of operation and with the lifter arm 76 rotating clockwise. Additionally, the latch arm 56 is not retracted by actuation of the lever arm 58 during the raising operation. As indicated, the lever arm 58 is biased towards its default position after the actuator pin 92 moves out of engagement therewith during the lowering operation. The latch arm 56 is thus positioned in the vertically upward path of travel of the pin 66. The latch arm 56 is provided with a ramped travel surface 94 for the pin 66. The ramped surface 94 is angled such that engagement of the latch pin 28 with the ramped surface 94 urges the latch arm 56 to pivot outward in direction "A" until the latch pin 66 passes out of engagement with the ramped surface 94, and the spring means 70 urges the latch means back to a biased position so that the latch pin 66 can be brought into engagement with the pin-receiving portion 64 of the latch arm 56 as the roller 78 moves through an arcuate path in the clockwise direction.

Those of skill in the art will appreciate that the harmonic motion of the carrier 28 brought about by the arcuate rotational path of the lifter arm 76 results in a so-called "soft touch" motion of the carrier 28 proximate the upper and lower limits of vertical range of motion. This "soft touch" motion is beneficial in reducing wear and tear on the lowerator 18, as well as providing for the relatively delicate handling of the workpiece.

Referring now to FIGS. 7–11, and more particularly FIGS. 7 and 8, the preferred embodiment of a lowerator 18a according to the present invention is illustrated. The present invention discloses an apparatus for transporting at least one workpiece along at least one rail 20a defining a path 12a of travel through a workstation 14a. While the present invention preferably includes a single electric monorail overhead system, the invention contemplates application to other known configurations of workpiece conveyors including multi-rail, both electric and non-electric, or non-electric monorail configurations. In the preferred configuration, a trolley 26a is movable along the rail 20a and is controllable to stop at the workstation 14a by appropriate switches and/or sensors and control circuitry as is known to those skilled in the art. A carrier 28a is connected to the trolley 26a for supporting at least one workpiece during movement of the trolley 26a along the rail 20a with respect to the workstation 14a. The carrier 28a is movable between a raised position, illustrated in FIGS. 7 and 8, and a lowered position, shown in phantom in FIG. 7, when positioned at the workstation 14a. At least one latch 54a is provided for maintaining the carrier 28a in the raised position with respect to the trolley 26a when the latch 54a is in the locked position. The latch 54a allows movement of the carrier 28a to the lowered position when the latch 54a is in the released position. An actuator 16a is provided for each latch 54a. Each actuator 16a is movable from a first position to a second position. As the actuator moves from the first position to the second position, the actuator 16a engages the carrier 28a, releases the latch 54a, and lowers the carrier 28a to the lowered position. While moving in the reverse direction from the second position to the first position, the actuator 16a raises the carrier 28a, locks the latch 54a, and disengages from the carrier 28a.

Preferably, the actuator 16a is supported separate from the rail 20a. In the preferred configuration, the actuator 16a is supported from the floor or base 72a of the workstation 14a. The actuator 16a has a cam follower or roller 78a connected to one end of a rotatable crank arm 76a. The cam follower is engagable with a cam surface 40a formed on the carriage 28a. The cam follower 78a is engagable with the cam surface 40a when the carriage 28a is stopped at the workstation 14a. Preferably, the cam follower 78a is in the form of a roller having an inner cylindrical spool surface positioned between radially enlarged flange members capable of guiding and maintaining the carrier 28a in operative contact with the cam follower 78a as the carrier 28a is moved between the raised position and the lowered position. In the preferred configuration, the cam surface 40a is formed as a bottom surface of the carrier 28a.

Figure 9C:
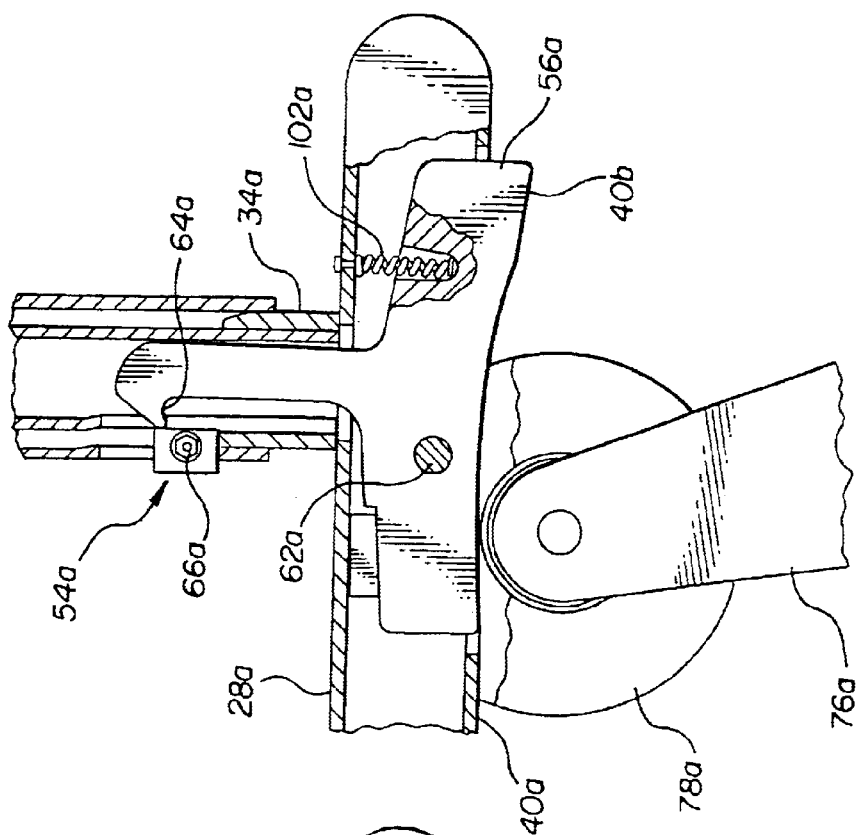
Figure 9B:
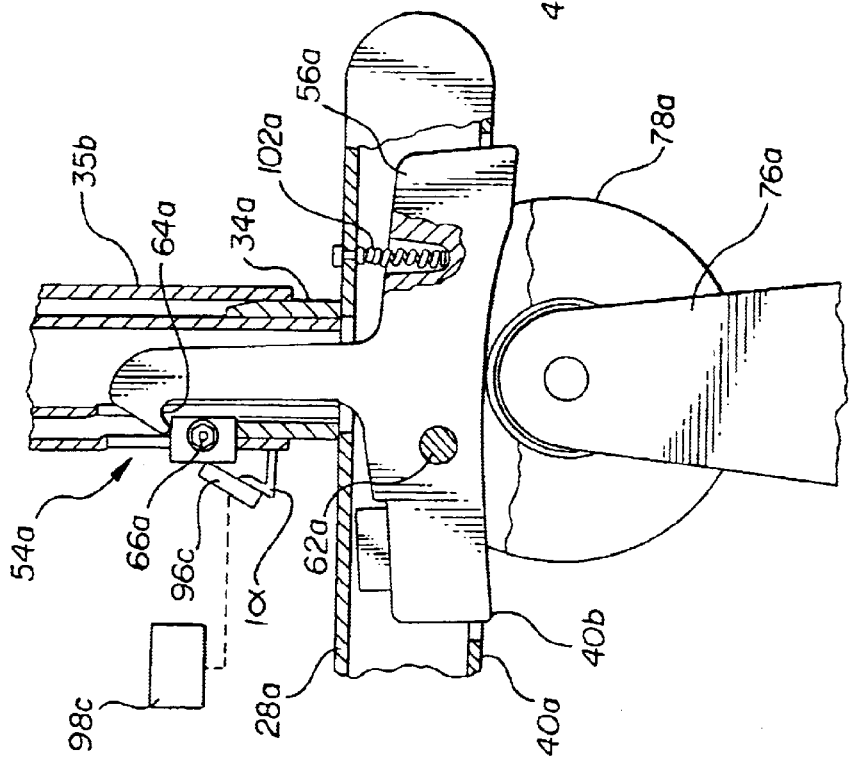

Referring now to FIGS. 7–9C, and more particularly to FIGS. 9A–9C, the preferred embodiment of the latch 54a includes a second cam engaging surface 40b for actuating the latch between the locked position and the released position. The latch 54a is rotated in response to engagement of the second cam surface 40b by the cam follower 78a as the cam follower 78a simultaneously moves along the first and second cam surfaces 40a, 40b. In the illustrated embodiment, the latch 54a is pivotally connected to the carrier 28a. A pair of telescoping posts or vertical elements 34a connect the carrier 28a to the trolley 26a. Slide blocks or bearing blocks 30a are enclosed within the telescoping posts 34a to prevent infiltration of foreign matter, while guiding movement of the carrier 28a with respect to the trolley 26a.

Figure 11:
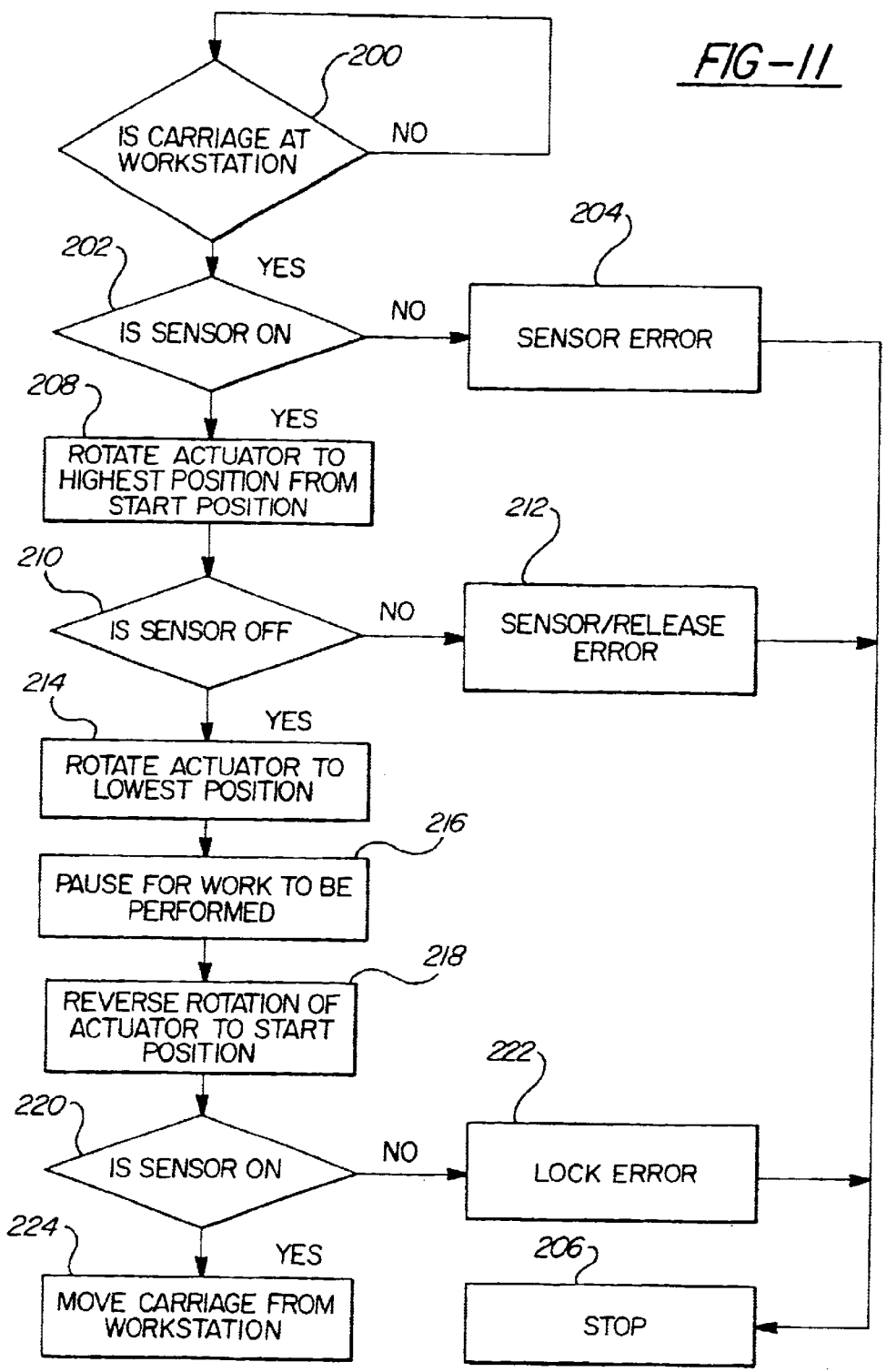
FIG. 11 is a simplified flow diagram of a control method for a lowerator according to the present invention.
Figure 12:
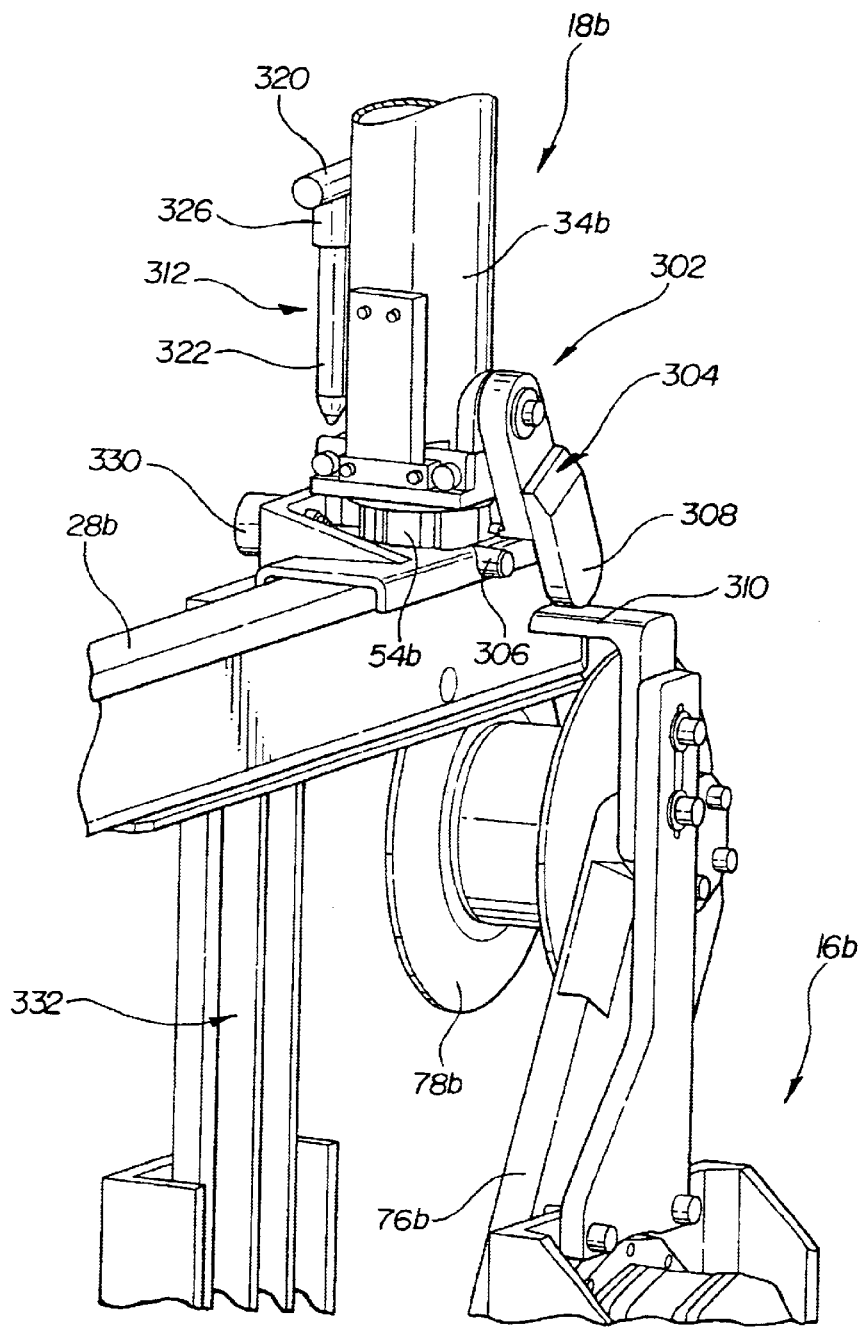
FIG. 12 is a perspective view of a lock for preventing unintentional unlatching of the carrier with respect to the trolley according to the present invention.
Figure 13:
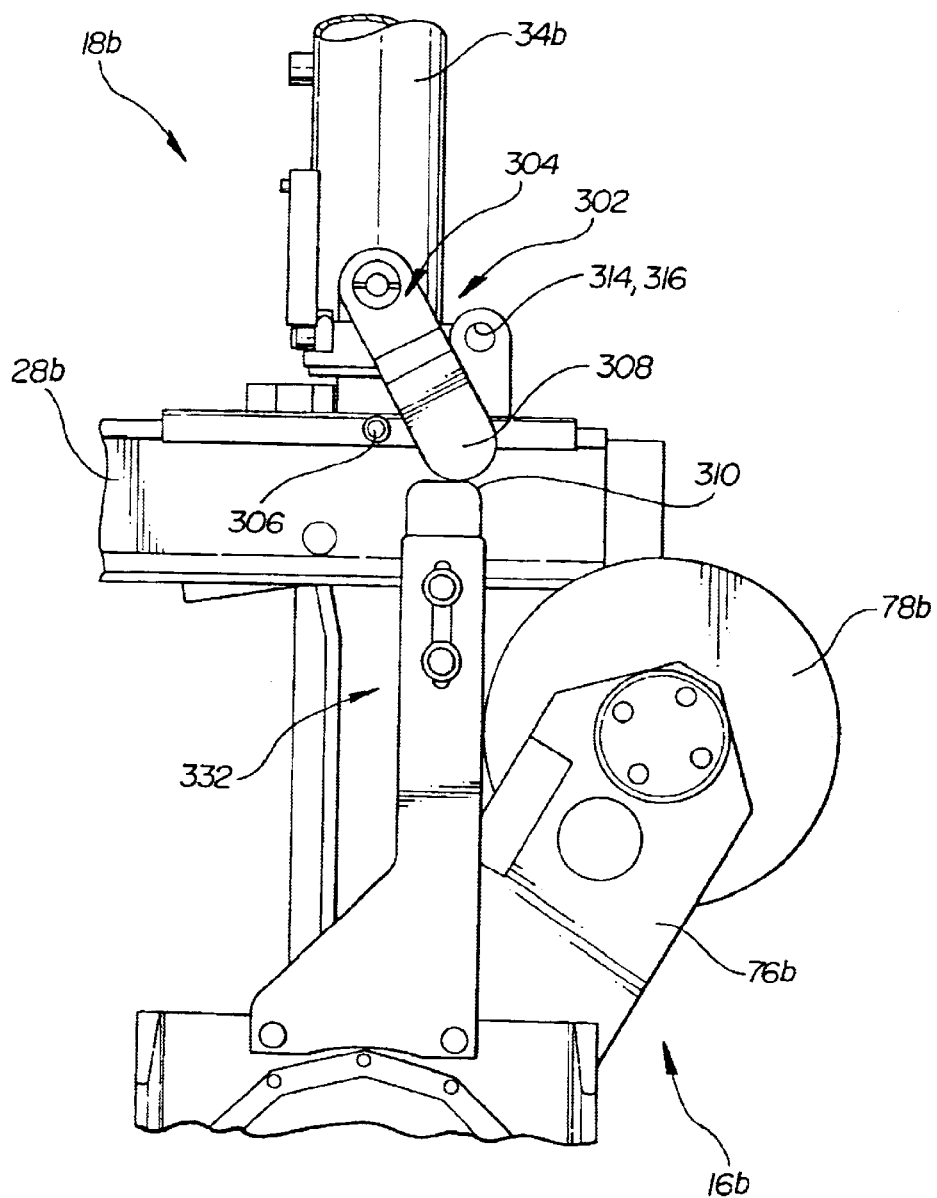
FIG. 13 is a side view of the lock illustrated in FIG. 12.

In the preferred configuration, best seen in FIGS. 10 and 11, at least one position sensor 96a is supported with respect to the telescoping posts 34a for generating a signal corresponding to a retracted and locked position of the post (illustrated in FIG. 10 in solid line). Control means 98a, such as a control circuit, is provided for receiving the signal from the position sensor 96a and for processing the signal in accordance with a program stored in memory. Means 100a is provided for sensing if the carriage or workpiece conveyance means 10a is at the workstation 14a. If the carrier 28a is at the workstation 14a, the control means 98a determines if the latch 54a is in the locked position. If the latch 54a is not in the locked position, the control means 98a generates an error signal. If the latch 54a is in the locked position, the control means 98a actuates the actuator 16a in a first direction of travel moving from the first or start position to an intermediate position. When the actuator 16a is in the intermediate position, the control means 98a determines if the latch 54a has been released from the locked position. If the latch 54a is still in the locked position when the actuator 16a is in the intermediate position, the control means 98a generates an error signal. If the latch 54a is in the released position when the actuator 16a is in the intermediate position, the control means 98a continues actuation of the actuator 16a from the intermediate position to a second position causing the carrier 28a to move from the raised position to the lowered position. After work has been performed on the workpiece at the workstation 14a when the carrier 28a is in the lowered position, the control means 98a actuates the actuator 16a in a second direction of travel to move from the second position to the first position. When the actuator 16a has returned to the first position, the control means 98a determines if the carrier 28a is in the raised and locked position through the position sensor 96a. If the carrier 28a is not in the raised and locked position when the actuator 16a is in the first position, the control means 98a generates an error signal. If the carrier 28a is in the raised and locked position when the actuator 16a is in the first position, the control means 98a generates a signal for activating the motor driven trolley 26a for moving the carriage 28a from the workstation 14a.

In operation, conveying means such as trolley 26a is driven along rail means defining a path of travel with respect to a workstation 14a. The conveying means includes a carrier 28a for supporting at least one workpiece for delivery to the workstation 14a. As the trolley 26a and carrier 28a approach the workstation 14a, the carrier 28a operably engages guide means 86a for aligning and orienting the carrier 28a in the proper position as the carrier 28a enters the workstation 14a for operative engagement with the lowerator 18a located at the workstation 14a. The guide means 86a can include a pair of converging guide rails to direct the leading edge of the carrier 28a into the proper position as the carrier 28a enters the workstation 14a, and/or can include a pair of rollers 88a rotatably supported on posts 90a for guiding the leading edge of the carrier 28a into the proper orientation as it enters the workstation 14a.

When the trolley 26a has reached a predetermined position at the workstation 14a, the motor driven trolley 26a is stopped and a signal is generated by a sensor 100a indicating that the carrier 28a is at the workstation. The signal is received by the control means 98a and processed according to a control program stored in memory. The control program can include the steps illustrated in FIG. 11. Initially, the program determines if the carrier 28a is at the workstation in query step 200. If a signal indicating that the carrier 28a is at the workstation 14a is not received, the program branches back to reiterate the same query in step 200. When a signal is received from the sensor 100a indicating that the carrier 28a is at the workstation 14a, the program continues to the next query step 202 to determine if the position sensor 96a indicates that the carrier 28a is in the raised and locked position. The position sensor 96a can be in the form of a proximity sensor as illustrated in FIG. 10 positioned appropriately to operatively indicate the presence of a radially extending metal portion of the post 34a when in the raised and locked position as illustrated in solid line. If the position sensor 96a is not generating a signal, the control program branches to generate an error signal in step 204 indicating that a sensor failure has occurred. After indicating that there is a sensor failure, the program continues to step 206 where further operations are stopped pending operator determination of the cause of the sensor error reported in step 204. If a signal is received from the position sensor 96a indicating that the carrier 28a is in the raised and locked position, the program continues on to step 208 where the motor 82a is activated in order to drive the lifter arm 76a through gear box 84a to bring the cam follower or roller 78a into operative engagement with the first cam surface 40a formed on the bottom of the carrier 28a. Preferably, the lifter arm 76a is driven in a first rotational direction and engages the bottom of the carrier 28a prior to reaching the upper limit of travel through the defined arc of rotation. As best seen in FIG. 9A, as the lifter arm 76a continues to rotate from the start position, and when at approximately 16° of rotation, the roller 78a has lifted the carrier 28a a sufficient distance to relieve the weight from the latch 54a, or approximately 0.375 inches. As the roller 78a is raising the carrier 28a, the roller 78a simultaneously engages the second cam surface 40b as the roller 78a continues to engage the first cam surface 40a. The lifting motion of the carrier 28a raises the latch 54a a sufficient distance to remove the pin 66a from the pin-receiving portion 64a of the latch arm 56a. As the carrier 28a is being lifted by the roller 78a, the outwardly extending metal portion of the post 34a is also raised and moved toward the position shown in phantom in FIG. 10. As the roller 78a reaches the upper limit of travel, the radially outwardly extending metal portion of the post 34a reaches the position shown in phantom and the signal from the position sensor 96a is lost or discontinued. The uppermost position of the roller 78a is shown in FIG. 9B where the roller 78a has continued simultaneous contact with the first and second cam surfaces 40a, 40b and is in the process of rotating the latch arm 56a about the pivot 62a to unlatch the carrier 28a from the trolley 26a. When in this uppermost or intermediate position, the control program proceeds to the next query step 210 to determine if the position sensor signal has been discontinued. If the signal from the position sensor 96a is still present, the program branches to step 212 to indicate a sensor and/or release error, since the carrier 28a has not been raised a sufficient distance to unlatch the carrier 28a from the trolley 26a and continued movement would therefore cause damage to the conveying structure. The program then continues on to the stop step 206 where no further action is taken until an operator determines the cause of the error. If the signal from the position sensor 96a has been discontinued, the control program continues on to step 214 where rotation of the lever arm 76a continues without stopping through the intermediate position to rotate the actuator to the lowest position placing the carrier 28a in the position shown in phantom in FIG. 7. As the roller 78a passes through the intermediate position, the simultaneous engagement with the first and second cam surfaces 40a, 40b rotates the lever arm 56a a sufficient distance to completely release the pin 66a and bypass the pin as the carrier 28a is lowered. The position of the roller 78a illustrated in FIG. 9C is approximately 45° from the start position and the carrier 28a has been lowered approximately 0.375 inches down from the fully raised position. When the carrier 28a is in the lowest position, work is performed on the workpiece or workpieces that have been transferred to the workstation 14a. After completion of the work being performed at the workstation 14a, an appropriate signal is sent to the control means 98a and the motor 82a is activated in the reverse direction to move the lifter arm 76a through the gear box 84a from the lowest or second position back toward the first or start position. The pause for work to be performed is illustrated in step 216 of the control program followed by step 218 indicating reverse rotation of the actuator to the start position. When rotating in the reverse direction, the roller 78a passes through the reverse order of movement previously described, first reaching the position illustrated in FIG. 9C, then FIG. 9B, followed by FIG. 9A, and finally back to the start position illustrated in FIGS. 7 an 8. When in the start position, the radially outwardly extending metal portion of the post 34a has returned to the solid line position illustrated in FIG. 10, and the control program continues to query step 220 to determine if the position sensor 96a is generating a signal to the control means 98a. If no signal is received from the position sensor 96a, the control program branches to step 222 where an error signal is generated indicating a sensor or lock error. The program then continues on to the stop step 206 where no further action is taken until the cause of the error is determined by an operator. If the signal from the position sensor 96a is received by the control means 98a, the program branches to the step 224 allowing the motor trolley 26a to be energized to remove the carrier 28a from the workstation 14a. Preferably, biasing means 102a is provided for urging the lever 56a toward the unlocked position of rotation with respect to pivot pin 62a. In the preferred configuration, the lower portion of the carrier 28a is formed as a box beam having a cutout portion for receiving the rotatable latch arm 56a.

The present invention discloses a simple, efficient, and reliable assembly system including an overhead rail means defining a path of travel with respect to a workstation, and means for conveying a workpiece along the rail means. The conveying means according to the present invention includes a carrier for supporting at least one workpiece for delivery to the workstation, where the carrier is movably associated with the conveying means so as to be vertically positionable between raised and lowered positions with respect to the conveying means. A lowerator according to the present invention automatically moves the carrier between the raised and lowered positions. Latch means is provided for securing the carrier to the conveying means in the raised position for transport to and from the workstation. At least one lifter defines a path of travel in first and second directions, where movement in the first direction the lifter actuates the latch means to uncouple the carrier from the conveying means, for movement into the lowered position, and where movement in the second direction lifts the carrier from the lowered position to the raised position and actuates the latch means so as to secure the carrier to the conveying means in the raised position.

In the preferred configuration, at least two vertically extending members or posts are provided at opposite ends of the carrier, and a latch and position sensor is associated with each post, where the position sensor can signal if the carrier has been raised and placed in the locked position prior to transport out of the workstation, and can also determine if the carrier has been raised sufficiently and unlatched prior to movement of the carrier into the lowered position. If either of the sensors does not generate the appropriate signal, the control program automatically stops further actuation of the lowerator mechanism. It is believed that only one sensor is required for each post in order to determine the position of the vertical member and the latch, however multiple sensors could be provided for additional signals to the control means without departing from the spirit and scope of the present invention.

Referring now to FIGS. 12–17, at least one rail, such as rail 20 shown in FIG. 1, defines a path 12 of travel through a workstation. A trolley 26b is movable along the rail and controllable to stop at the workstation. A carrier 28b is connected to the trolley 26b for supporting at least one workpiece during movement of the trolley 26b along the rail 20 with respect to the workstation. The carrier 28b is movable between the raised position and the lowered position when located at the workstation. The trolley 26b and the carrier 28b are slidably engagable with respect to one another. The carrier 28b slidably connects with the trolley 26b through a pair of telescoping posts or vertical elements 34b. Latch means 54b can include at least one latch movable between an engaged position and a disengaged position. The latch holds the carrier 28b in the raised position with respect to the trolley 26b when in the engaged position and allows movement of the carrier 28b to the lowered position when the latch is in the disengaged position.

Lowerator 18b can include an actuator 16b for each latch. The actuator 16b is movable from a first position to a second position. During movement of the actuator 16b from the first position to the second position, the actuator 16b engages and releases the latch 54b, and moves the carrier 28b from the raised position to the lowered position.

Means 302 for locking the latch 54b in the engaged position is provided according to the present invention. The locking means 302 can prevent unintentional unlatching of the carrier 28b with respect to the trolley 26b. The locking means 302 prevents unintentional vertical movement of the carrier 28b with respect to a corresponding trolley 26b. The locking means can include a lock 304 for holding the latch in the engaged position. The lock 304 is defined by a pin 306 operably engagable with the latch 54b for holding the latch 54b in the engaged position when the lock 304 is in a locked position. The lock 304 allows movement of the latch 54b to a disengaged position when the pin 306 is in an unlocked position. A catch 308 is movable between a trapped position and a released position. When in the trapped position, the catch 308 operably engages an outer end of the pin 306 to trap the pin 306 in the locked position, and to prevent movement of the pin 306 into the unlocked position. When in the released position, the catch 308 is clear of the outer end of the pin 306, and movement of the pin 306 is allowed between the locked position and the unlocked position. The pin 306 is movable within an aperture formed in the carrier 28*b* between the locked and unlocked positions. When the pin 306 is in the locked position, an inner end of the pin 306 is located in obstructing relationship with respect to free movement of the latch 54*b* away from the engaged position. Movement of the pin 306 preferably occurs passively in response to movement of the latch 54*b* and/or the catch 308. It should be recognized that active movement of the pin 306 can be accomplished if desired. By way of example and not limitation, the pin 306 can be urged in one direction by any appropriate biasing means, and can be moved in a direction opposite to the biasing force by contact with any appropriate actuator or drive, such as by contact with the latch 54*b*, or the catch 308, or a power driven actuator located at the workstation. Movement of the catch 308 between the trapped and released positions preferably occurs passively, as the catch 308 engages a stationary member or finger 310 located at a workstation as the carrier 28*b* is delivered to the workstation by the trolley 26*b* the catch 308 is moved from the trapped position to the released position, and as the catch 308 disengages from the finger 310 as the carrier 28*b* is removed from the workstation by the trolley 26*b* the catch 308 is moved from the released position to the trapped position. The catch 308 can be supported from the trolley 26*b* for pivoting movement about an axis of rotation between the trapped position and the released position in response to engagement with a stationary member 310 located at the workstation, such that the catch 308 is rotated to the released position when the trolley 26*b* is delivered and stopped at the workstation. It should be recognized that movement of the catch 308 can be active if desired, by engagement with any appropriate power actuator or drive located at the workstation. The combination of the pin 306 and catch 308 define a safety lock for locking the latch in the engaged position, and for preventing unintentional unlatching of the carrier 28*b* with respect to the trolley 26*b*.

Figure 14:
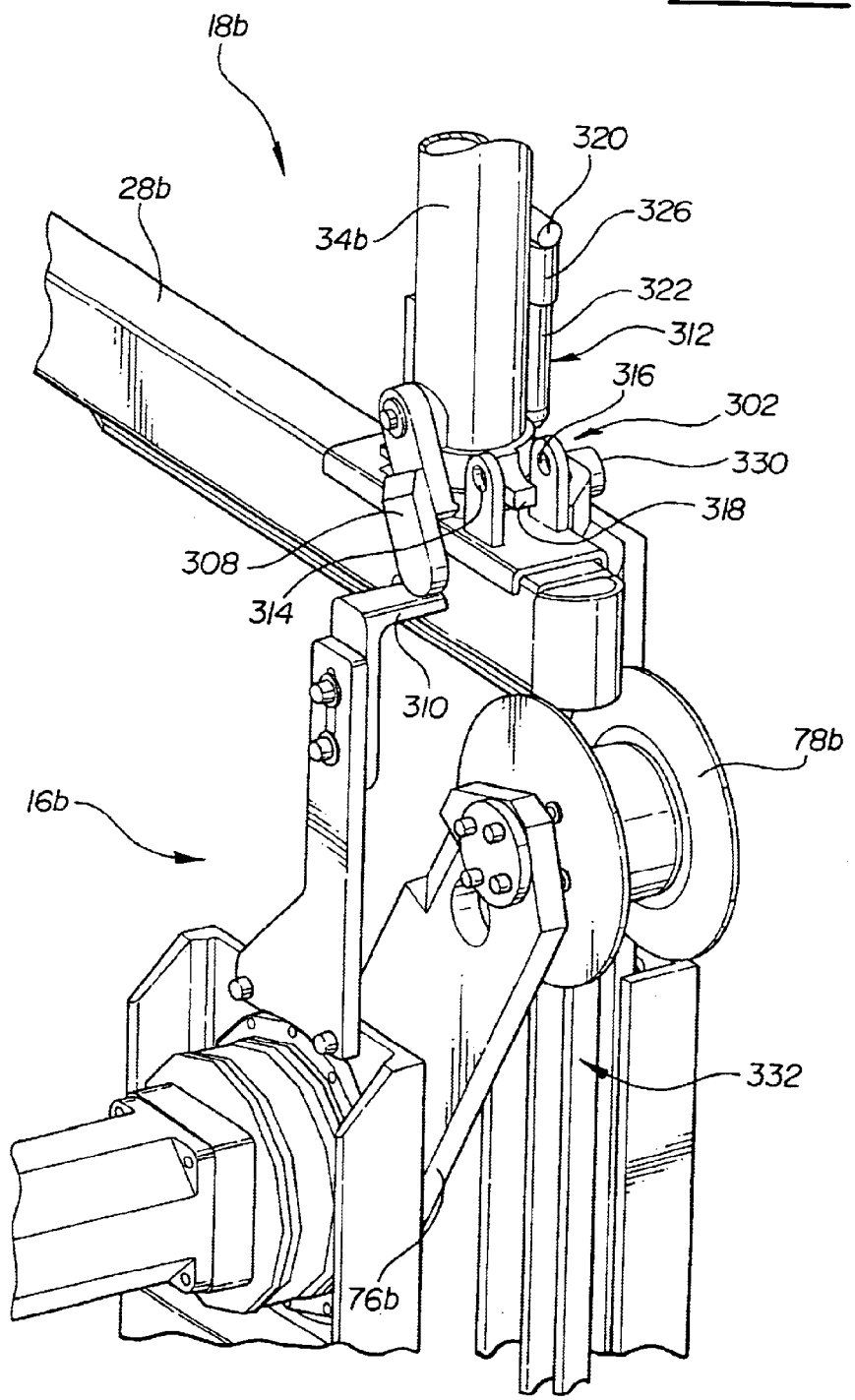
FIG. 14 is a perspective view of lock from a first position according to the present invention.
Figure 15:
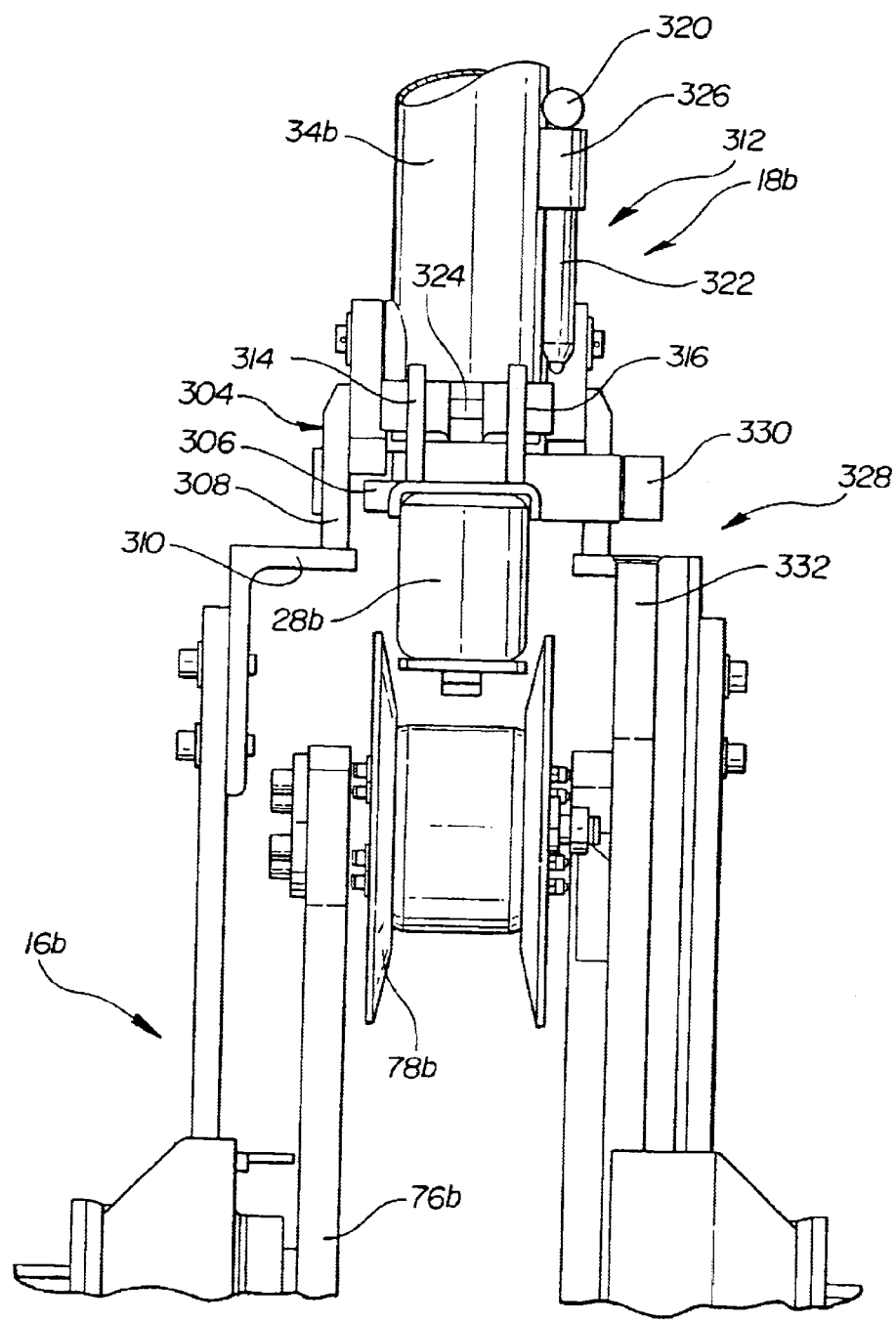
FIG. 15 is a right-hand view of the lock according to the present invention.
Figure 16:
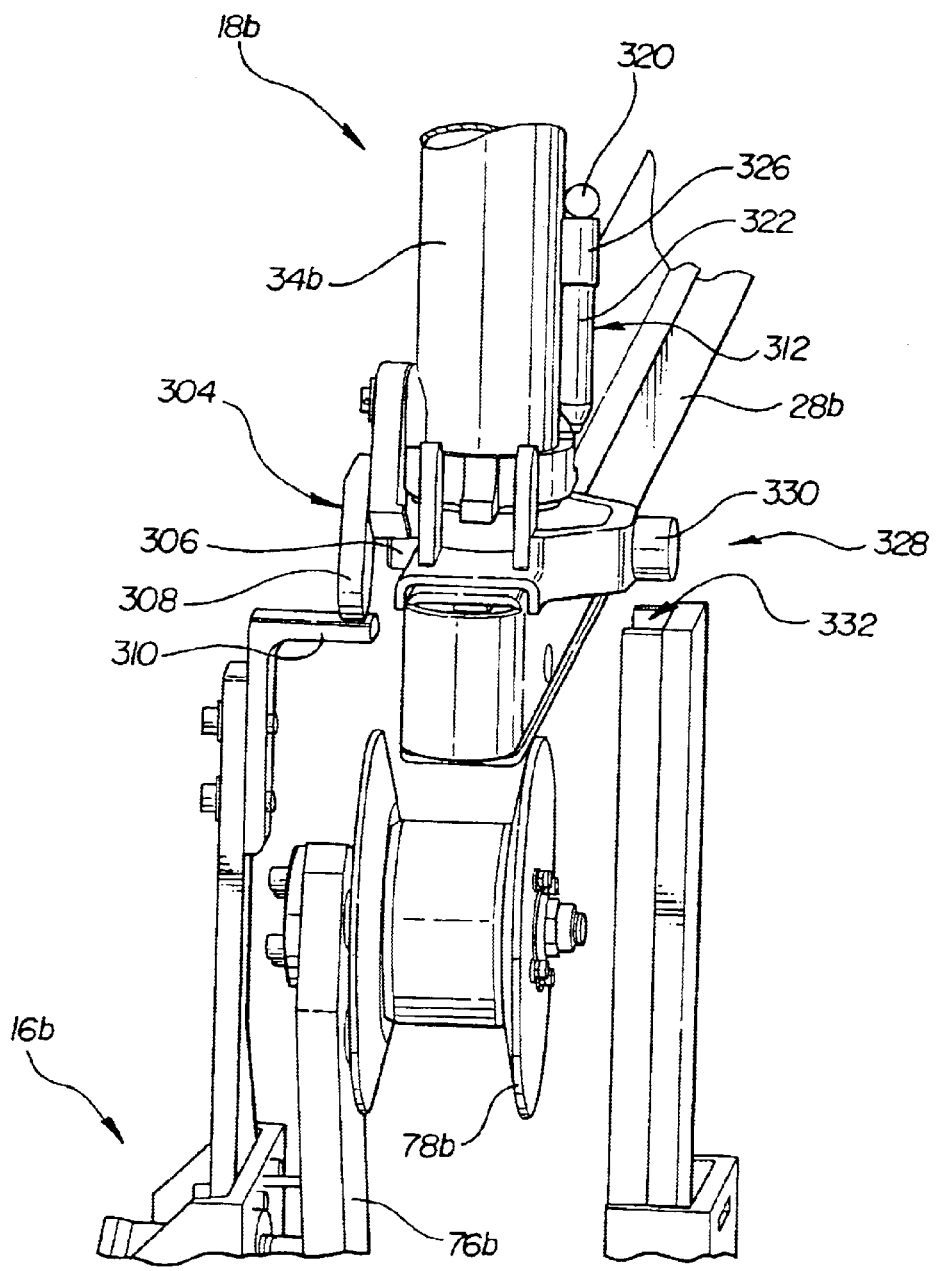
FIG. 16 is a perspective view of the lock from a second position according to the present invention.

The locking means 302 can include a lockout pin 312 operable with respect to the latch 54*b* for locking the latch 54*b* in the engaged position. The lockout pin 312 prevents movement of the latch 54*b* until the lockout pin 312 has been removed. The lockout pin 312 holds the carrier 28*b* in the raised position with respect to the trolley 26*b*. At least one of the carrier 28*b* and the trolley 26*b* includes a pair of coaxial apertures 314, 316 associated therewith for receiving the lockout pin 312 in a position obstructing free movement of the latch 54*b* away from the engaged position. By way of example and not limitation, in the illustrated embodiment best seen in FIG. 14, the carrier 28*b* includes two coaxial apertures 314, 316 for receiving the lockout pin 312. A lockout block or member 318 can be located between the lockout pin 312 and the latch 54*b* for obstructing movement of the latch 54*b* when the lockout pin 312 is located within the coaxial apertures 314, 316. In other words, the lockout pin 312 can act directly or indirectly with respect to the latch 54*b* for obstructing movement of the latch 54*b* from the engaged position toward the disengaged position. The lockout pin 312 can include a handle portion 320 and a body portion 322 extending substantially transverse to the handle portion 320 as best seen in FIG. 14. The body portion 322 can be sized to slide through the apertures 314 and 316. The latch 54*b* can include a surface 324 corresponding to an outer surface or profile of the body portion 320. When the pin 312 is engaged within the apertures 314, 316 and with surface 324 of the latch 54*b*, the carrier 28*b* is prevented from vertically moving relative to the trolley 26*b*. When the pin 312 is not engaged within the apertures 314, 316 or with surface 324 of the latch 54*b*, the pin 312 can be stored in a sleeve 326 connected to the telescoping posts or vertical elements 34*b*. The combination of the lockout pin 312 and cooperating coaxial apertures 314, 316 defines a safety lockout for preventing any movement of the carrier 28*b* with respect to the trolley 26*b* until the lockout pin 312 is removed. The lockout pin can be used to hold the carrier 28*b* in the raised position with respect to the trolley 26*b* during maintenance or other activities when relative movement between the carrier 28*b* and trolley 26*b* is not desired.

Guide means 328 according to the present invention can be provided at any workstation where the carrier 28*b* is to be moved to the lowered position with respect to the trolley 26*b*. The guide means 328 can include a guide member or roller 330 operably associated with the carrier 28*b*. A guide channel 332 is located at the workstation for receiving the guide member therein while the carrier 28*b* is being moved for guiding vertical movement of the carrier 28*b* between the raised and lowered positions. The guide channel 332 can have an enlarged open, upper portion for directing the guide member 330 into the lower portion of the channel 332 during the initial stage of lowering movement of the carrier 28*b*. The combination of the guide member 330 and channel 332 directs the workpiece supported by the carrier 28*b* into a predetermined position with respect to a fixture located at the workstation, so that the workpiece can be transferred from the carrier to the fixture while being accurately positioned and located within the fixture for any work to be performed on the workpiece at the workstation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for transporting at least one workpiece comprising:
   a trolley supporting a carrier for movement between a raised position and a lowered position relative to the trolley;
   a releasable latch for holding the carrier in the raised position with respect to the trolley when in an engaged position;
   means for locking the latch in the engaged position with a longitudinally reciprocal pin;
   an elongate guide member having opposite sides extending in a direction of carrier travel and operably associated with a lower portion of the carrier; and
   a stationary guide channel located at a workstation for engaging the opposite sides of the guide member when the carrier is being moved into the workstation and for guiding vertical movement of the carrier between the raised and lowered positions while at the workstation.

2. The apparatus of claim 1 wherein the pin is operably engagable with the latch for holding the latch in the engaged position when in a locked position, and for allowing movement of the latch to a disengaged position when the pin is in an unlocked position.

3. The apparatus of claim 2 wherein the locking means further comprises:
   a catch operably engagable with the pin and movable between a trapped position and a released position, where the catch retains the pin in the locked position when the catch is in the trapped position, and allows movement of the pin from the locked position to the unlocked position when the catch is in the released position.

4. The apparatus of claim 3 wherein the locking means further comprises;
the catch operable to passively move the pin from the unlocked position to the locked position in response to the catch moving from the released position to the trapped position.

5. An apparatus for transporting at least one workpiece comprising:
a trolley supporting a carrier for movement between a raised position and a lowered position relative to the trolley;
a releasable latch for holding the carrier in the raised position with respect to the trolley when in an engaged position; and
means for locking the latch in the engaged position, wherein the locking means includes a pin operably engagable with the latch for holding the latch in the engaged position when in a locked position, and for allowing movement of the latch to a disengaged position when the pin is in an unlocked position, and a catch operably engagable with the pin and movable between a trapped position and a released position, where the catch retains the pin in the locked position when the catch is in the trapped position, and allows movement of the pin from the locked position to the unlocked position when the catch is in the released position, the catch supported by the trolley for pivoting movement about an axis for rotation between the trapped position and the released position in response to engagement with a stationary member located at the workstation, such that the catch is rotated to the released position when the trolley comes to a stop at the workstation.

6. An apparatus for transporting at least one workpiece comprising:
a trolley supporting a carrier for movement between a raised position and a lowered position relative to the trolley;
a releasable latch for holding the carrier in the raised position with respect to the trolley when in an engaged position; and
means for locking the latch in the engaged position, wherein the locking means includes a pin operably engagable with the latch for holding the latch in the engaged position when in a locked position, and for allowing movement of the latch to a disengaged position when the pin is in an unlocked position, the pin mounted for reciprocating passive movement within an aperture formed in the carrier from the locked position to the unlocked position in response to the latch moving from the engaged position toward the disengaged position.

7. The apparatus of claim 1 further comprising:
a lockout pin operable with respect to the latch for preventing movement of the latch from the engaged position until the lockout pin is removed.

8. An apparatus for transporting at least one workpiece comprising:
a trolley supporting a carrier for movement between a raised position and a lowered position relative to the trolley;
a releasable latch for holding the carrier in the raised position with respect to the trolley when in an engaged position;
means for locking the latch in the engaged position; and
a lockout pin operable with respect to the latch for preventing movement of the latch from the engaged position until the lockout pin is removed, the carrier having a pair of coaxial apertures associated therewith for receiving the lockout pin in a position obstructing free movement of the latch from the engaged position.

9. The apparatus of claim 8 further comprising:
a member engagable between the lockout pin and the latch for obstructing movement of the latch when the lockout pin is located within the coaxial apertures.

10. An apparatus for transporting at least one workpiece comprising:
a trolley supporting a carrier for movement between a raised position and a lowered position relative to the trolley;
an elongate guide member having opposite sides extending in a direction of carrier travel and associated with a lower portion of the carrier; and
a stationary guide channel located at a workstation for engaging the opposite sides of the guide member during horizontal movement of the trolley when the carrier is being moved into the workstation, and for guiding vertical movement of the carrier between the raised and lowered positions while the trolley is stationary at the workstation.

11. An apparatus for transporting at least one workpiece comprising:
a carrier connectible with respect to a trolley for supporting at least one workpiece for movement along a rail with respect to a workstation, the carrier moveable between a raised position and a lowered position when positioned at the workstation;
at least one latch positioned adjacent a bottom surface of the carrier and moveable between a disengaged position and an engaged position, the latch holding the carrier in the raised position with respect to the trolley when in the engaged position and allowing movement of the carrier with respect to the trolley when in the disengaged position; and
a lock operably engagable with the latch for preventing unintentional movement of the latch from the engaged position to the disengaged position.

12. The apparatus of claim 11 wherein lock further comprises:
a reciprocal pin operably engagable with the latch for holding the latch in the engaged position when in a locked position, and for allowing movement of the latch to the disengaged position when in an unlocked position.

13. The apparatus of claim 12 wherein the lock further comprises:
a catch supported by the trolley for movement between a trapped position and a released position, where the catch retains the pin in the locked position when the catch is in the trapped position, and allows movement of the pin from the locked position to the unlocked position when the catch is in the released position.

14. The apparatus of claim 13 wherein the lock further comprises:
the catch operable to passively move the pin from the unlocked position to the locked position in response to the catch moving from the released position to the trapped position.

15. An apparatus for transporting at least one workpiece comprising:
- a carrier connectible with respect to a trolley for supporting at least one workpiece for movement along a rail with respect to a workstation, the carrier moveable between a raised position and a lowered position when positioned at the workstation;
- at least one latch moveable between a disengaged position and an engaged position, the latch holding the carrier in the raised position with respect to the trolley when in the engaged position and allowing movement of the carrier with respect to the trolley when in the disengaged position; and
- a lock operably engagable with the latch for preventing unintentional movement of the latch from the engaged position to the disengaged position, wherein the lock includes a catch supported by the trolley for movement between a trapped position and a released position, where the catch retains the pin in the locked position when the catch is in the trapped position, and allows movement of the pin from the locked position to the unlocked position when the catch is in the released position, the catch supported by the trolley for pivoting movement about an axis for rotation between the trapped position and the released position in response to engagement with a stationary member located at the workstation, such that the catch is rotated to the released position when the trolley comes to a stop at the workstation.

16. An apparatus for transporting at least one workpiece comprising:
- a carrier connectible with respect to a trolley for supporting at least one workpiece for movement along a rail with respect to a workstation, the carrier moveable between a raised position and a lowered position when positioned at the workstation;
- at least one latch moveable between a disengaged position and an engaged position, the latch holding the carrier in the raised position with respect to the trolley when in the engaged position and allowing movement of the carrier with respect to the trolley when in the disengaged position; and
- a lock operably engagable with the latch for preventing unintentional movement of the latch from the engaged position to the disengaged position, wherein the lock includes a pin operably engagable with the latch for holding the latch in the engaged position when in a locked position, and for allowing movement of the latch to the disengaged position when in an unlocked position, the pin mounted for reciprocating passive movement within an aperture formed in the carrier from the locked position to the unlocked position in response to the latch moving from the engaged position toward the disengaged position.

17. The apparatus of claim 11 further comprising:
- a lockout pin operable with respect to the latch for preventing movement of the latch from the engaged position until the lockout pin is removed.

18. An apparatus comprising:
- a carrier connectible with respect to a trolley for supporting at least one workpiece for movement along a rail with respect to a workstation, the carrier moveable between a raised position and a lowered position when positioned at the workstation;
- at least one latch moveable between a disengaged position and an engaged position, the latch holding the carrier in the raised position with respect to the trolley when in the engaged position and allowing movement of the carrier with respect to the trolley when in the disengaged position;
- a lock operably engagable with the latch for preventing unintentional movement of the latch from the engaged position to the disengaged position; and
- a lockout pin operable with respect to the latch for preventing movement of the latch from the engaged position until the lockout pin is removed, the carrier having a pair of coaxial apertures associated therewith for receiving the lockout pin in a position obstructing free movement of the latch from the engaged position.

19. The apparatus of claim 18 further comprising:
- a member engagable between the lockout pin and the latch for obstructing movement of the latch when the lockout pin is located within the coaxial apertures.

20. The apparatus of claim 11 wherein the lock further comprises:
- a pin movable longitudinally between a locked position engaging the latch for preventing movement of the latch from the engaged position, and a released position for allowing movement of the latch between the engaged and disengaged positions.

* * * * *